United States Patent
Yanagi

(10) Patent No.: US 7,072,259 B2
(45) Date of Patent: Jul. 4, 2006

(54) RECORDING MEDIUM AND INFORMATION STORAGE APPARATUS

(75) Inventor: Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/886,774

(22) Filed: Jul. 8, 2004

(65) Prior Publication Data
US 2004/0246839 A1    Dec. 9, 2004

Related U.S. Application Data

(62) Division of application No. 09/536,705, filed on Mar. 28, 2000, now Pat. No. 6,934,242.

(30) Foreign Application Priority Data
Jul. 6, 1999    (JP) ................................. 11-192311

(51) Int. Cl.
*G11B 5/09*    (2006.01)
*G11B 7/24*    (2006.01)

(52) U.S. Cl. .................. 369/47.22; 369/275.3

(58) Field of Classification Search ............ 369/275.3, 369/275.1, 275.4, 44.28, 30.12, 44.26, 47.28, 369/47.22, 53.34, 53.37, 59.25, 53.2, 53.28, 369/44.34, 59.11, 47.32, 59.18; 360/48–49, 360/46.51
See application file for complete search history.

(56) References Cited

U.S. PATENT DOCUMENTS

| | | |
|---|---|---|
| 4,001,883 A | 1/1977 | Strout et al. .................. 360/48 |
| 4,475,183 A | 10/1984 | Marchant et al. .......... 369/59.1 |
| 4,475,186 A | 10/1984 | Gutleber |
| 5,402,411 A | 3/1995 | Maeda et al. |
| 5,446,724 A | 8/1995 | Tabe et al. ................ 369/275.1 |
| 5,493,552 A | 2/1996 | Kobori ........................ 369/109 |
| 5,594,716 A | 1/1997 | Inoue |
| 5,724,338 A | 3/1998 | Birukawa et al. |
| 5,742,582 A | 4/1998 | Suzuki ..................... 369/275.1 |
| 5,787,228 A | 7/1998 | Fiely et al. |
| 5,796,712 A | 8/1998 | Moribe et al. |
| 5,812,520 A | 9/1998 | Nakayama et al. |
| 5,901,123 A | 5/1999 | Taniguchi et al. |
| 5,978,327 A | 11/1999 | Kuroda et al. |
| 6,034,936 A | 3/2000 | Ogawa et al. |
| 6,046,968 A | 4/2000 | Abramovitch et al. |
| 6,058,099 A | 5/2000 | Senshu ..................... 369/275.3 |
| 6,118,752 A | 9/2000 | Miyagawa et al. |
| 6,163,522 A * | 12/2000 | Nakane et al. ........... 369/275.3 |
| 6,167,007 A | 12/2000 | Ogawa et al. |
| 6,226,257 B1 | 5/2001 | Morimoto |
| 6,252,845 B1 | 6/2001 | Hino et al. ............... 369/275.3 |
| 6,256,266 B1 | 7/2001 | Mitani |
| 6,337,839 B1* | 1/2002 | Nakane et al. ........... 369/59.25 |
| 6,400,661 B1 | 6/2002 | Ogawa et al. |
| 6,493,306 B1 | 12/2002 | Nakane et al. ........... 369/59.18 |

(Continued)

FOREIGN PATENT DOCUMENTS

EP    0 559 449 A2    9/1993

(Continued)

*Primary Examiner*—Ali Neyzari
(74) *Attorney, Agent, or Firm*—Greer, Burns & Crain, Ltd.

(57) ABSTRACT

A recording medium and an information storage apparatus having high formatting efficiency are provided. The recording medium and the information storage apparatus give IDs for data to be stored. In one embodiment, one ID is provided for two data areas, and no two IDs are situated in line with each other on two adjacent tracks.

5 Claims, 28 Drawing Sheets

U.S. PATENT DOCUMENTS

| | | | |
|---|---|---|---|
| 6,560,055 B1 * | 5/2003 | Nemazie et al. | 360/53 |
| 6,606,294 B1 | 8/2003 | Takemura et al. | 369/275.3 |
| 6,731,575 B1 | 5/2004 | Taniguchi et al. | |
| 6,744,706 B1 | 6/2004 | Miyagawa et al. | |

FOREIGN PATENT DOCUMENTS

| | | |
|---|---|---|
| EP | 0 752 701 A2 | 1/1997 |
| EP | 0 753 845 A1 | 1/1997 |
| EP | 0 784 313 A2 | 7/1997 |
| EP | 886 266 | 12/1998 |
| EP | 0 893 793 A2 | 1/1999 |
| EP | 1 039 452 A2 | 9/2000 |
| JP | 6159565 | 5/1994 |
| JP | 7093904 | 4/1995 |
| JP | 7093905 | 4/1995 |
| JP | 8203253 | 8/1996 |
| JP | 8255431 | 10/1996 |
| JP | 07 057272 | 3/2003 |

\* cited by examiner

RECORDING MEDIUM AND INFORMATION STORAGE APPARATUS

This application is a Divisional of application Ser. No. 09/536,705, filed on Mar. 8, 2000, now U.S. Pat. No. 6,934,242.

BACKGROUND OF THE INVENTION

1. Field of the Invention

The present invention generally relates to recording media and information storage apparatuses, and, more particularly, to a recording medium and an information storage apparatus which allocate an ID to each piece of data and store information.

In recent years, there has been an increasing demand for larger capacity information storage apparatuses, as the amount of information in the field of information processing has been increasing rapidly. In a recording medium, such as a magneto-optical disk, used in an information storage apparatus, information is recorded based on IDs. Because of this ID-based recording method, a larger recording capacity at higher recording density requires a larger number of IDs, resulting in poor formatting efficiency.

In a magneto-optical disk, headers including IDs are formed by pits. A disk substrate is produced by an injection molding method using a base plate. On the base plate, the pits are already formed by a photo processing technique. On the disk substrate, a recording layer and a protection layer are formed to produce the magneto-optical disk. Thus, the pit size is determined by the wavelength of the laser beam.

In the magneto-optical disk, the mark size is reduced by the MSR (Magnetically induced Super Resolution) technology to a point where the pre-formatted pit size is twice or three times larger than the recorded mark size. As a result, the existence of the pits hinders the improvement in recording density.

2. Description of the Related Art

FIG. 1 shows an example format of a conventional magneto-optical disk.

A magneto-optical disk 1 of the prior art is rotated at a constant rotational speed. The relative speed between a light beam and the magneto-optical disk 1 on the inner peripheral side of the magneto-optical disk 1 is different from that on the outer peripheral side of the magneto-optical disk 1. Therefore, the magneto-optical disk 1 is divided into four zones Z1 to Z4. The innermost zone Z1 has the lowest recording frequency among the four zones Z1 to Z4, and the outermost zone Z4 has the highest recording frequency. This setting of recording frequencies is called a ZCAV (Zone Constant Angular Velocity) method, which is used to improve recording capacity.

In the magneto-optical disk 1, a header area 2 is formed in every sector having a predetermined length. A light beam is positioned to a target sector in accordance with address (ID) information recorded in advance on the corresponding header area 2 with a pit. A data area 3 in which information is to be stored is formed between every two header areas 2.

FIG. 2 shows the data structure of an example data track of the conventional magneto-optical disk.

The data track is made up of a plurality of data sectors 4. Each of the data sectors 4 includes a header 5 and a data field 6. An address for identifying each data field 6 is stored in each corresponding header 5, and information is stored in each data field 6.

A buffer 7 is disposed between every two data sectors 4. A gap 8 is formed between a header 5 and a data field 6. In each of the zones Z1 to Z4, the headers 5 of two adjacent tracks are situated next to each other. The data fields 6 of two adjacent tracks in the same zone are also situated next to each other.

FIG. 3 shows the data structure of an example header of the conventional magneto-optical disk.

Each of the headers 5 comprises a sector mark 9, a first VFO (Variable Frequency Oscillator) synchronizing area 10, an address mark 11, a first track address 12, a first sector address 13, a first error correcting code 14, a second VFO synchronizing area 15, an address mark 16, a second track address 17, a second sector address 18, a second error correcting code 19, and a postamble 20.

The sector mark 9 represents the start of a data sector 4. The first VFO synchronizing area 10 initiates VFO synchronization for reading the first track address 12 and the first sector address 13. The first address mark 11 represents the start of the first track address 12 and the first sector address 13. The first track address 12 represents the track address of scanned data. The first sector address 13 represents the sector address of the scanned data. The first error correcting code 14 is used to correct an error in the first track-address 12 and the first sector address 13.

The second VFO synchronizing area 15 initiates VFO synchronization for reading the second track address 17 and the second sector address 18. The second address mark 16 represents the start of the track address 17 and the second sector address 18. The second track address 17 represents the track address of scanned data. The second sector address 18 represents the sector address of the scanned data. The second error correcting code 19 is used to correct an error in the second track address 17 and the second sector address 18. The postamble 20 represents the end of the header 5.

The position of a light beam is determined from either the combination of the first track address 12 and the first sector address 13 or the combination of the second track address 17 and the second sector address 18.

FIG. 4 shows the data structure of an example data field of the conventional magneto-optical disk.

The data field 6 comprises a third VFO synchronizing-field 21, a synchronizing signal field 22, a data storage field 23, an error correcting code field 24, and a postamble field 25.

The third VFO synchronizing area 21 initiates VFO synchronization for recording and reproducing data. The synchronizing signal field 22 is synchronizing with the data field 6, and initiates synchronization for reproducing data. The data storage field 23 stores data. The error correcting code field 24 is used to detect and correct an error in the data stored in the data storage field 23. The postamble field 25 is added to reproduce the end of the data.

As explained above, the conventional magneto-optical disk 1 has a header 5 in each data sector 4 to determine the position of a light beam.

However, despite the small size of marks formed by the MSR technology, the headers are formed by pits that are twice or three times larger than the marks, because the pits are read out without the MSR technology. The pit size is restricted to the size corresponding to the wavelength of the laser beam. If the data density is doubled or tripled by the MSR technology, a large proportion of the recording area is occupied by the headers. As a whole, the recording density cannot be improved due to the large-sized pits. Furthermore, since one header is provided for each sector in the conventional magneto-optical disk, the formatting efficiency cannot be improved. Also, stagger caused in land/groove tracks reduces the formatting efficiency.

SUMMARY OF THE INVENTION

A general object of the present invention is to provide recording media and information storage apparatuses in which the above disadvantages are eliminated.

A more specific object of the present invention is to provide a recording medium and an information storage apparatus which have higher recording density with higher formatting efficiency.

The above objects of the present invention are achieved by a recording medium comprising: data sectors; and identifier portions each provided for more than one of the data sectors. The identifier portions are arranged in positions shifted from each other on adjacent tracks.

Since only one identifier portion is provided for more than one data sector in this recording medium, the formatting efficiency can be improved. Also, when an identifier portion is being read from a track, an identifier portion on the adjacent tracks is not read. Thus, accurate data access can be achieved. Furthermore, since the identifier portions are shifted from each other on two adjacent tracks, the MSR (Magnetically induced Super Resolution) technique can be employed to reduce the mark size, and headers including the identifier portions can be formed by pits, without reducing the recording density. As the headers are not in line with each other on two adjacent tracks, the headers can be wider than the tracks without adverse influence on each other. Thus, the recording density can be improved even with the use of pits.

The above objects of the present invention are also achieved by an information storage apparatus for making access to a recording medium which has data sectors, and identifier portions each provided for more than one data sectors, each of the identifier portions being arranged in positions shifted from each other on adjacent tracks. This information storage apparatus comprises an address determination unit which generates addresses of the data sectors based on the identifier portions, and determines whether a desired data sector is reached in accordance with the addresses.

Since only one identifier portion is provided for more than one data sector in this information storage apparatus, the formatting efficiency can be improved. Also, when an identifier portion is being read from a track, an identifier portion on the adjacent tracks is not read. Thus, accurate data access can be achieved.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
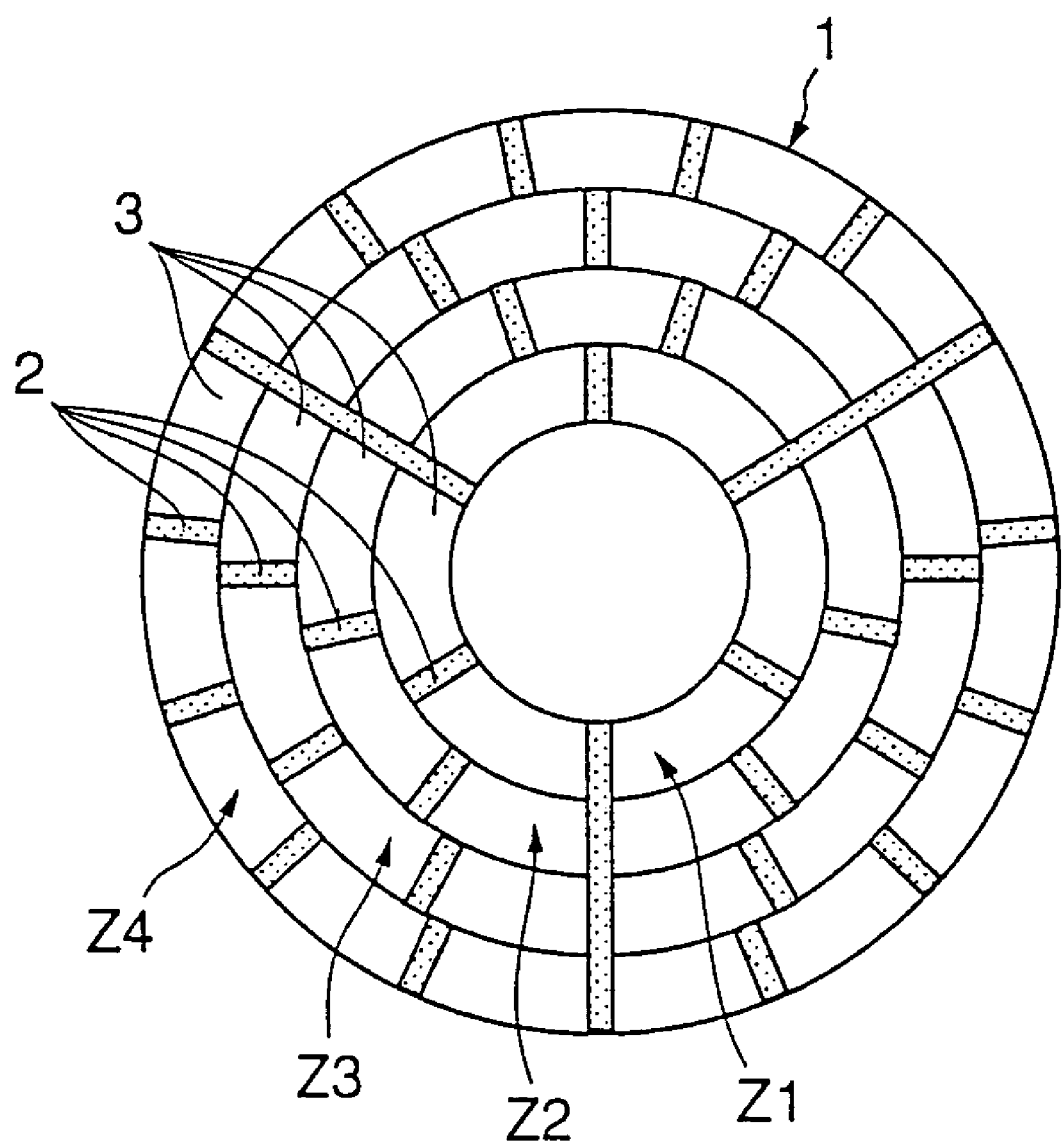
FIG. 1 shows an example disk format of a conventional magneto-optical disk.
Figure 2:
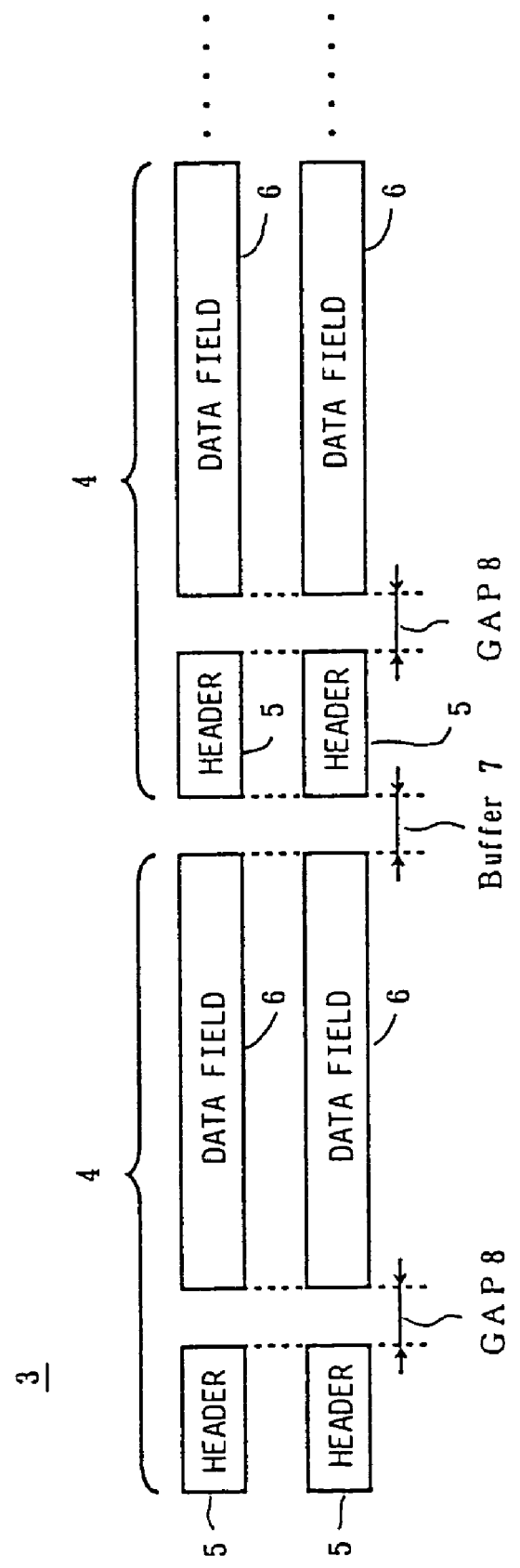
FIG. 2 shows the structure of an example data area of the conventional magneto-optical disk.
Figure 5:
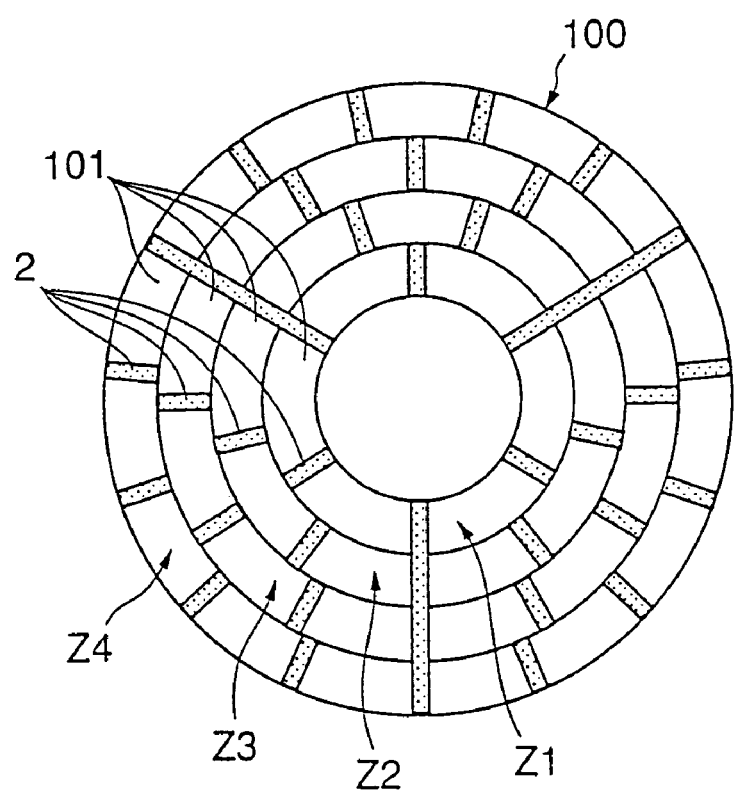
FIG. 5 shows a format of a first embodiment of a recording medium in accordance with the present invention.

FIG. 5 shows a format in a first embodiment of a recording medium in accordance with the present invention. In this figure, the same components as in FIG. 1 are denoted by the same reference numerals.

In a magneto-optical disk 100 of this embodiment, data areas 101 and headers 102 have different formats from the data areas 3 and the headers 5.

Figure 6:
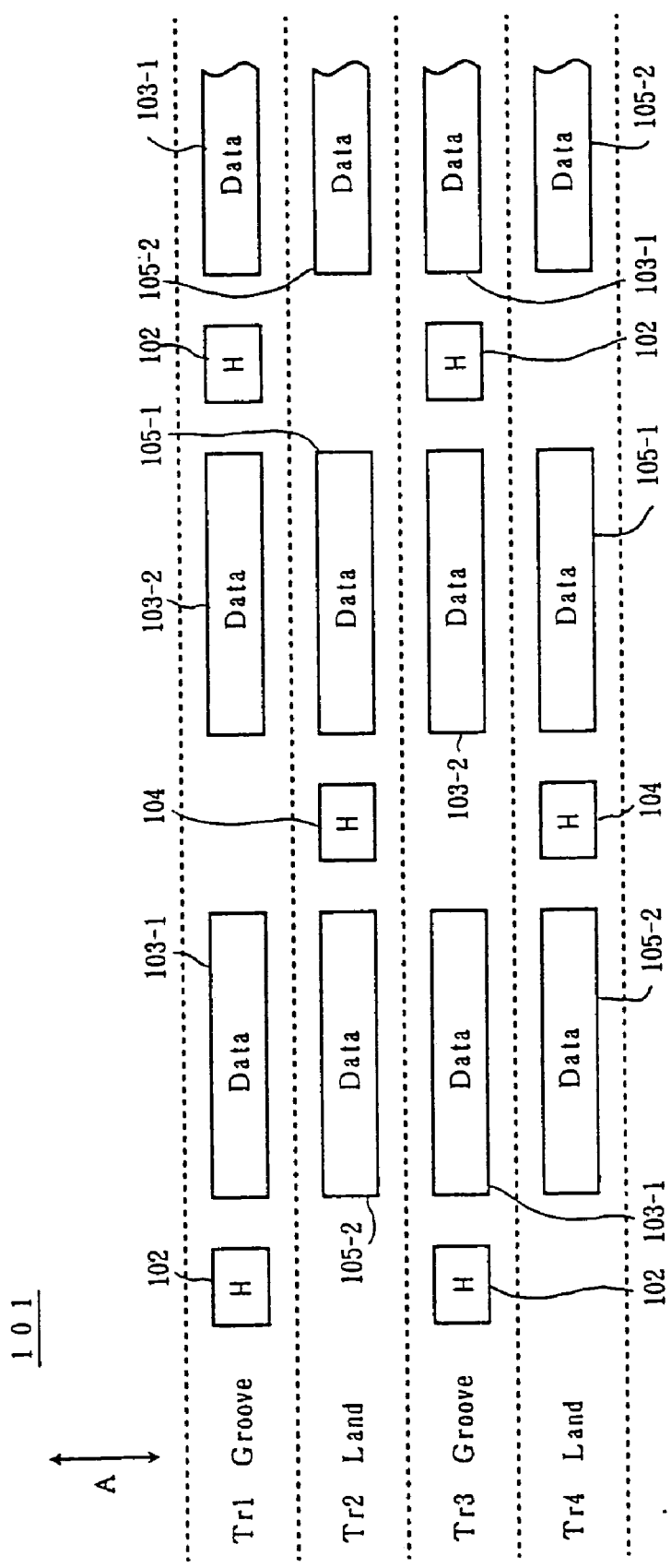
FIG. 6 shows a format of a data area of the first embodiment of the recording medium in accordance with the present invention.

FIG. 6 shows a format of a data area in the first embodiment of the recording medium. It should be understood that FIG. 6 does not show the actual physical positions of headers and data fields.

In the magneto-optical disk 100 of this embodiment, tracks Tr1 to Trn adjacent to one another are defined by grooves. The tracks Tr1, Tr3, . . . are the grooves etched in the substrate of the magneto-optical disk 100. On each of the tracks Tr1, Tr3, . . . , one header 102 is followed by two data fields 103-1 and 103-2.

The tracks Tr2, Tr4, . . . are formed in lands between the grooves-formed on the substrate of the magneto-optical disk 100. On each of the tracks Tr2, Tr4, . . . , one header 104 is followed by two data fields 105-1 and 105-2.

The headers 102 of the tracks Tr1, Tr3, . . . formed in the grooves are aligned in the radial direction of the magneto-optical disk 100 (i.e., in the direction of an arrow A). The headers 104 of the tracks Tr2, Tr4, . . . formed in the lands are also aligned in the radial direction of the magneto-optical disk 100 (i.e., in the direction of the arrow A).

The data fields 103-1 of the tracks Tr1, Tr3, . . . formed in the grooves and the data fields 105-2 of the tracks Tr2, Tr4, . . . formed in the lands are aligned in the radial direction of the magneto-optical disk 100 (i.e., in the direction of the arrow A). The data fields 103-2 of the tracks Tr1, Tr3, . . . formed in the grooves and the data fields 105-1 of the tracks Tr2, Tr4, . . . formed in the lands are also aligned in the radial direction of the magneto-optical disk 100 (i.e., in the direction of the arrow A).

While the headers 102 of the tracks Tr1, Tr3, . . . are scanned, for instance, the headers 104 of the adjacent tracks Tr2, Tr4, . . . are never simultaneously scanned. Thus, wrong ID detection can be prevented. Especially when a high-density recording technique, such as the MSR (Magnetic Super Resolution) technique, is employed, the adjacent headers never overlap with each other, because marks are smaller than pits. Thus, the track density can be improved. Furthermore, each two data fields require only one header, for instance, each header 102 for each two data fields 103-1 and 103-2, and each header 104 for each two data fields 105-1 and 105-2. In this arrangement, the number of headers formed on the magneto-optical disk 100 can be reduced. Thus, the formatting efficiency on the magneto-optical disk 100 can be improved.

Figure 3:
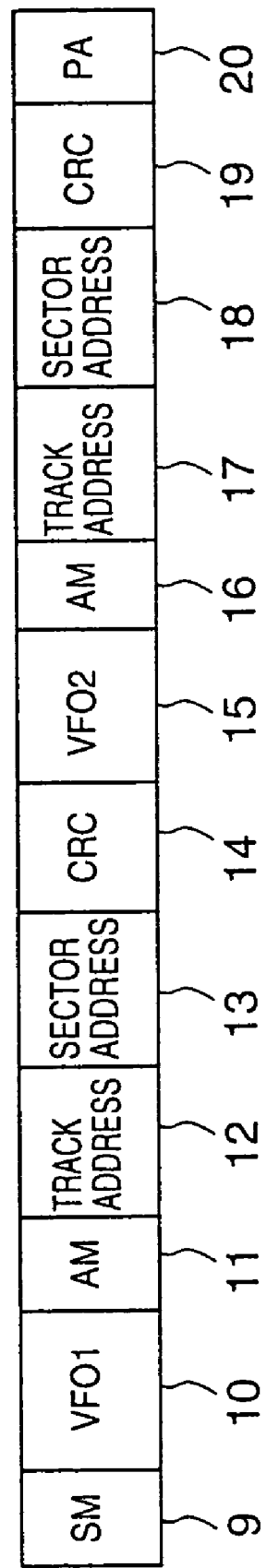
FIG. 3 shows the structure of an example header of the conventional magneto-optical disk.
Figure 4:
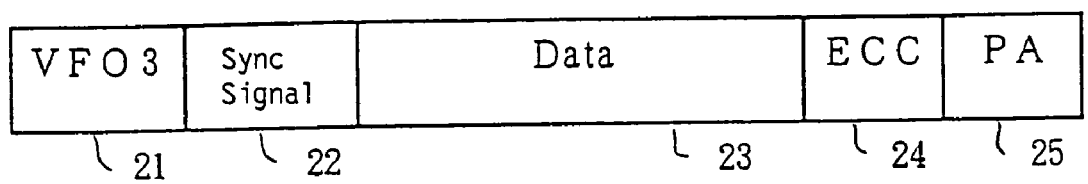
FIG. 4 shows the structure of an example data field of the conventional magneto-optical disk.

The structure of each header 102 is the same as the header 5 shown in FIG. 3. Likewise, the structure of each of the data fields 103-1, 103-2, 105-1, and 105-2 is the same as the data field 6 shown in FIG. 4.

Since only one header is set for each two data fields, it is necessary to generate two addresses from an address obtained from each header.

Figure 7:
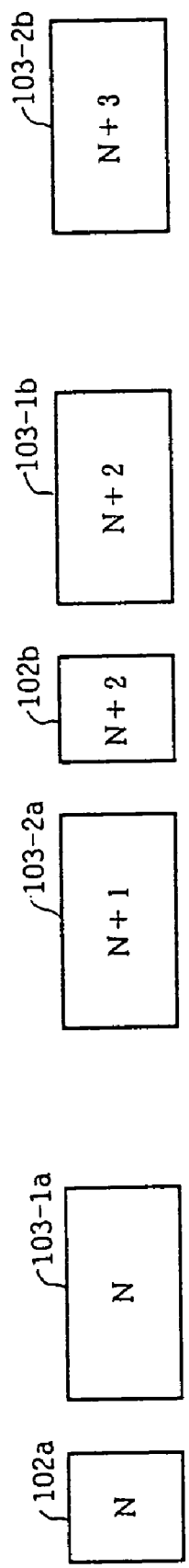
FIG. 7 shows an example of address setting for data fields in the first embodiment of the recording medium in accordance with the present invention.

FIG. 7 shows an example of address setting for the data fields in the first embodiment of the recording medium in accordance with the present invention. In this figure, more specific reference numerals 102a, 102b, 102c, . . . are allocated to the headers 102, and reference numerals 103-1a and 103-2a, 103-1b and 103-2b, . . . are allocated to the data fields 103-1 and 103-2.

As shown in FIG. 7, the address of the header 102a on the track Tr1 is "N", the address of the data field 103-1a is "N", and the address of the data field 103-2a is "N+1". The address of the next header 102b is "N+2", the address of the data field 103-1b is "N+2", and the address of the data field 103-2b is "N+3". The addresses of the data fields 103-2a and 103-2b are determined by adding "1" to the addresses "N" and "N+2" of the headers 102a and 102b, respectively, in accordance with a passing signal of one sector.

In the above manner, addresses can be continuously allocated to all the data fields. It should be understood that the above manner of address setting can be applied to the headers 104 and the data fields 105-1 and 105-2.

In this embodiment, even if the marks on the magneto-optical disk are formed by the MSR technique so as to dramatically reduce the widths of the marks, the headers 102 and 104 formed by pits never overlap with each other. Accordingly, the headers 102 and 104 wider than the respective tracks never have adverse effects on each other. Thus, the recording density can be dramatically increased.

Although the headers 102 and 104 are formed on lands and grooves, they can be formed on lands only. The formation of the headers 102 and 104 is not limited to the above examples, but other techniques can be employed to form the headers 102 and 104.

In the example shown in FIG. 7, the addresses of the headers 102 are not consecutive. However, it is also possible to allocate consecutive addresses to the headers 102. In such a case, the addresses of the data fields 103-1 and 103-2 are determined in compliance with the addresses of the headers 102.

Figure 8:
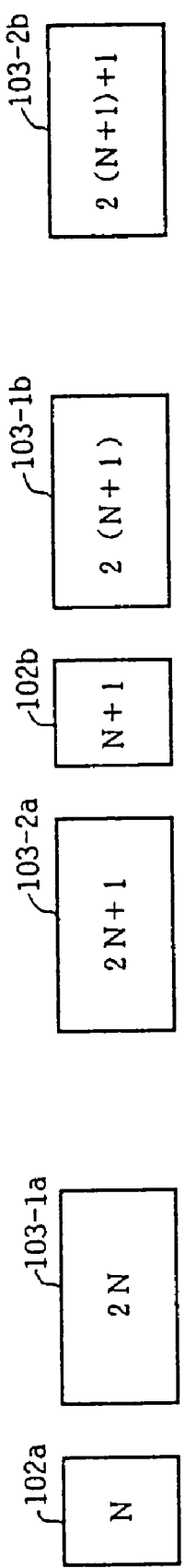
FIG. 8 shows another example of address setting for the data fields in the first embodiment of the recording medium in accordance with the present invention.

FIG. 8 shows another example of address setting for the data fields in the first embodiment of the recording medium in accordance with the present invention. In this figure, the same reference numerals as in FIG. 7 are allocated to the headers 102 and the data fields 103-1 and 103-2.

As shown in FIG. 8, the address of the header 102a is "N", and the address of the next header 102b is "N+1". The address of the data field 103-1a that immediately follows the header 102a is "2N", and the address of the data field 103-2a that follows the data field 103-1a is "2N+1". The address of the data field 103-1b that immediately follows the header 102b is "2(N+1)", and the address of the data field 103-2b that follows the data field 103-1b is "2(N+1)+1".

In this modification, consecutive addresses can be allocated to the headers 102. It should be understood that the above manner of address setting can be applied to the headers 104 and the data fields 105-1 and 105-2.

In the first embodiment, one header is set for each two data fields. However, it is also possible to put a sector mark between the data fields 103-1 and 103-2, for instance. With sector marks, the start of each sector can be accurately identified. Since the sector marks are identical and arranged in line across the adjacent tracks, regardless of the addresses, they can be accurately detected even if crosstalk occurs.

Figure 9:
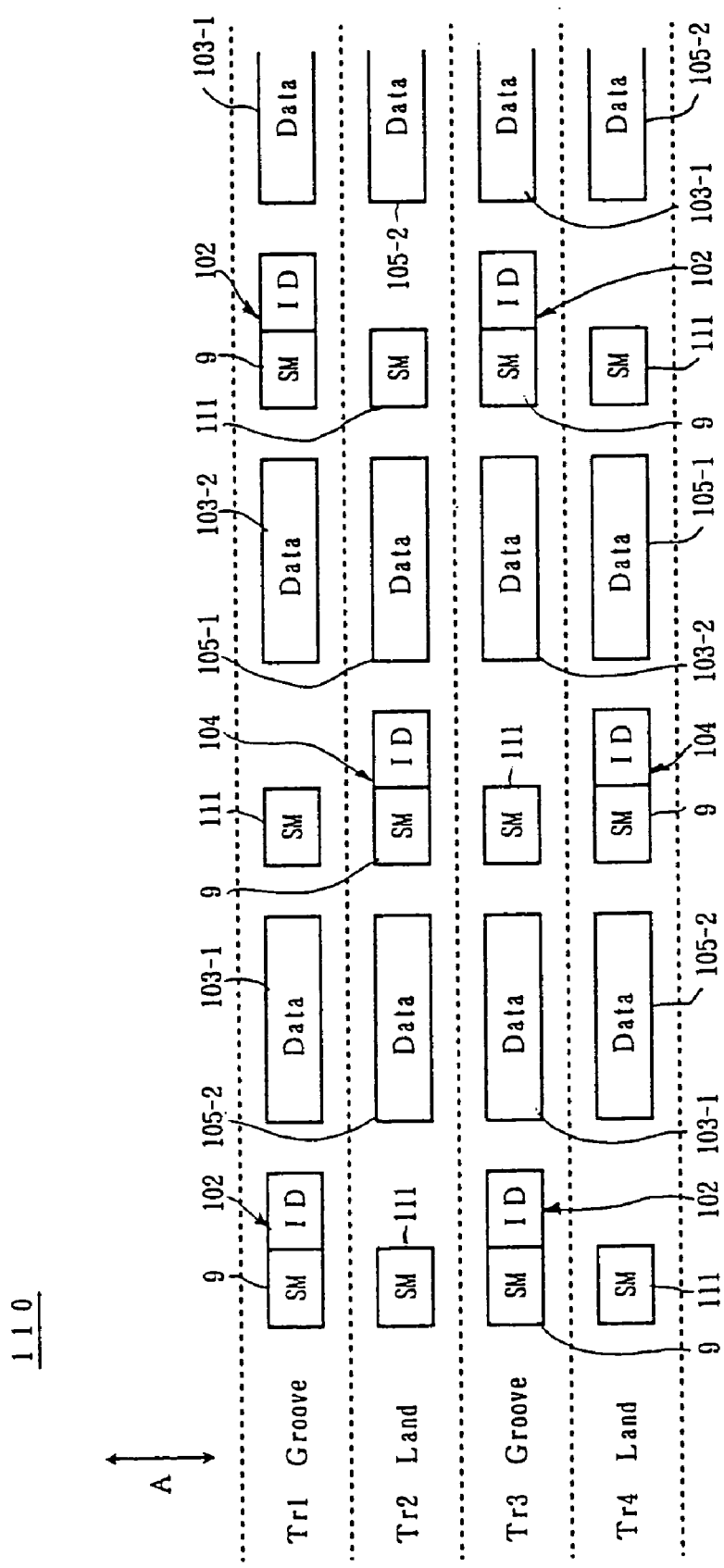
FIG. 9 shows a format of a data area in a second embodiment of the recording medium in accordance with the present invention.

FIG. 9 shows a format of a data area in a second embodiment of the recording medium in accordance with the present invention. In this figure, the same components as in FIG. 6 are denoted by the same reference numerals.

A data area 110 of this embodiment has a sector mark 111 between each two data fields 103-1 and 103-2, and between each two data fields 105-1 and 105-2. The sector mark 111 is identical to the sector mark 9 shown in FIG. 3.

Figure 10A:
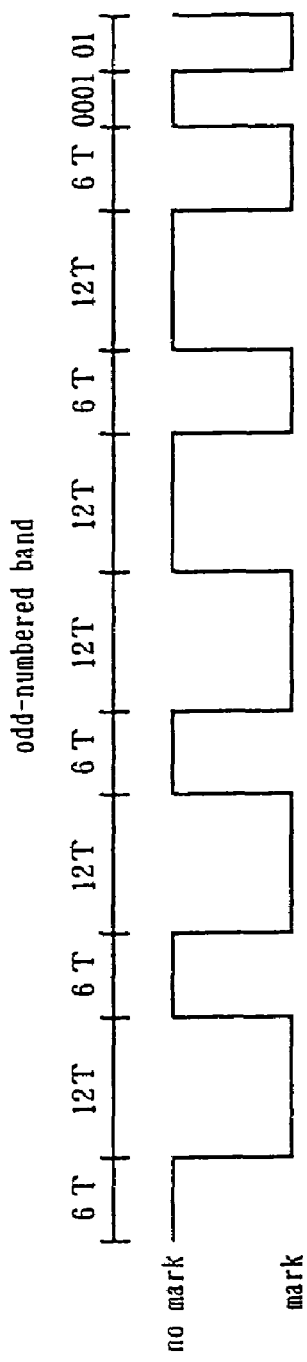
FIGS. 10A and 10B show the data structure of a sector mark in the second embodiment of the recording medium in accordance with the present invention.
Figure 10B:
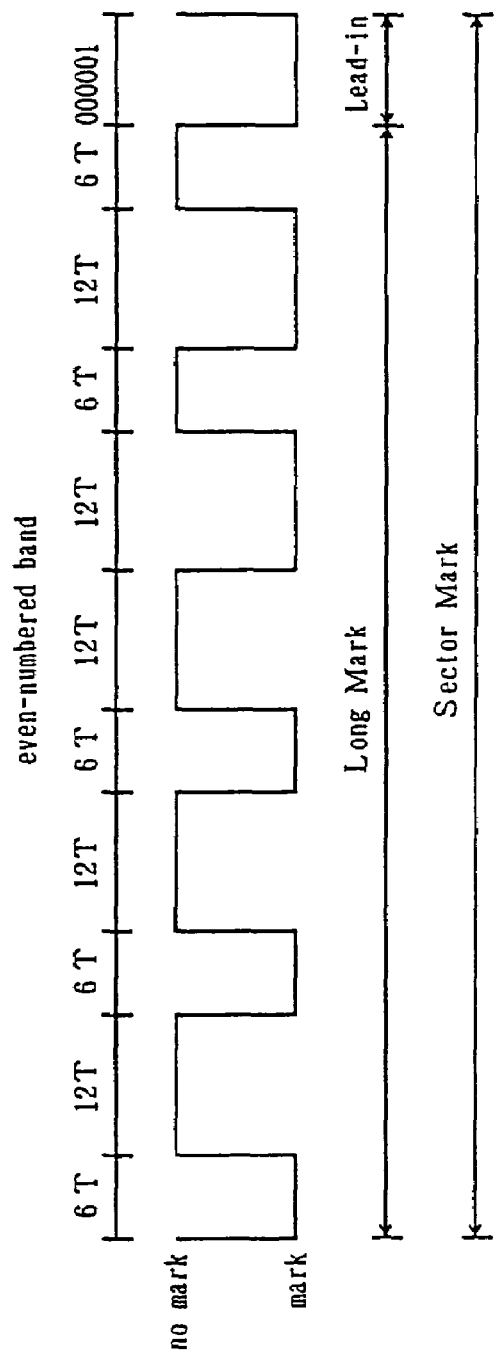

FIG. 10A shows the data structure of a sector mark having a first pattern, and FIG. 10 B shows the data structure of a sector mark having a second pattern. The first and second patterns shown in FIGS. 10A and 10B are the "ODD BAND" and the "EVEN BAND", respectively, specified in ISO/IEC 15041.

Either of the two patterns shown in FIGS. 10A and 10B is used for each sector mark 111. As the first pattern is the "ODD BAND" specified in ISO/IEC 15041, a sector mark 111 having the first pattern has three 6-cycle "6T" no-mark portions and three 12-cycle "12T" mark portions alternately, and two 12-cycle "12T" no-mark portions and two 6-cycle "6T" mark portions alternately, as shown in FIG. 10A. A bit pattern "0001"+"01" is added at the end of the first pattern.

The second pattern is the "EVEN BAND" specified in ISO/IEC 15041. A sector mark 111 having the second pattern has three 6-cycle "6T" mark portions and three 12-cycle "12T" no-mark portions alternately, and then two 12-cycle "12T" mark portions and two 6-cycle "6T" no-mark portions alternately, as shown in FIG. 10B. A bit pattern "000001" is added at the end of the second pattern.

The sector marks 111 are aligned with the sector marks 9 of the headers 102 and 104 on the adjacent tracks in the direction of the arrow A, i.e., in the radial direction of the magneto-optical disk 100. The sector marks 111 are put between the data fields 103-1 and 103-2, and between the data fields 105-1 and 105-2, so as to initiate synchronization to compensate window shifts caused by disk displacement or rotation jitter.

Although the sector marks 111 between the data fields 103-1 and 103-2 and between the data fields 105-1 and 105-2 are identical to the sector marks 9 in the headers 102 and 104 in this embodiment, the sector marks 111 may have different patterns from the sector marks 9. Also, the sector marks 111 are situated in line with the sector marks 9 of the adjacent headers 102 and 104. However, the sector marks 111 may be slightly deviated from the line of the sector marks 9 of the headers 102 and 104, so that the sector marks 111 do not overlap with the headers 102 and 104 in the radial direction. In this arrangement, the pits forming the headers 102 and 104 and the sector marks 111 can expand into the adjacent tracks. Thus, the track pitch can be made narrower than the diameter of a laser beam for forming the pits.

Figure 11:
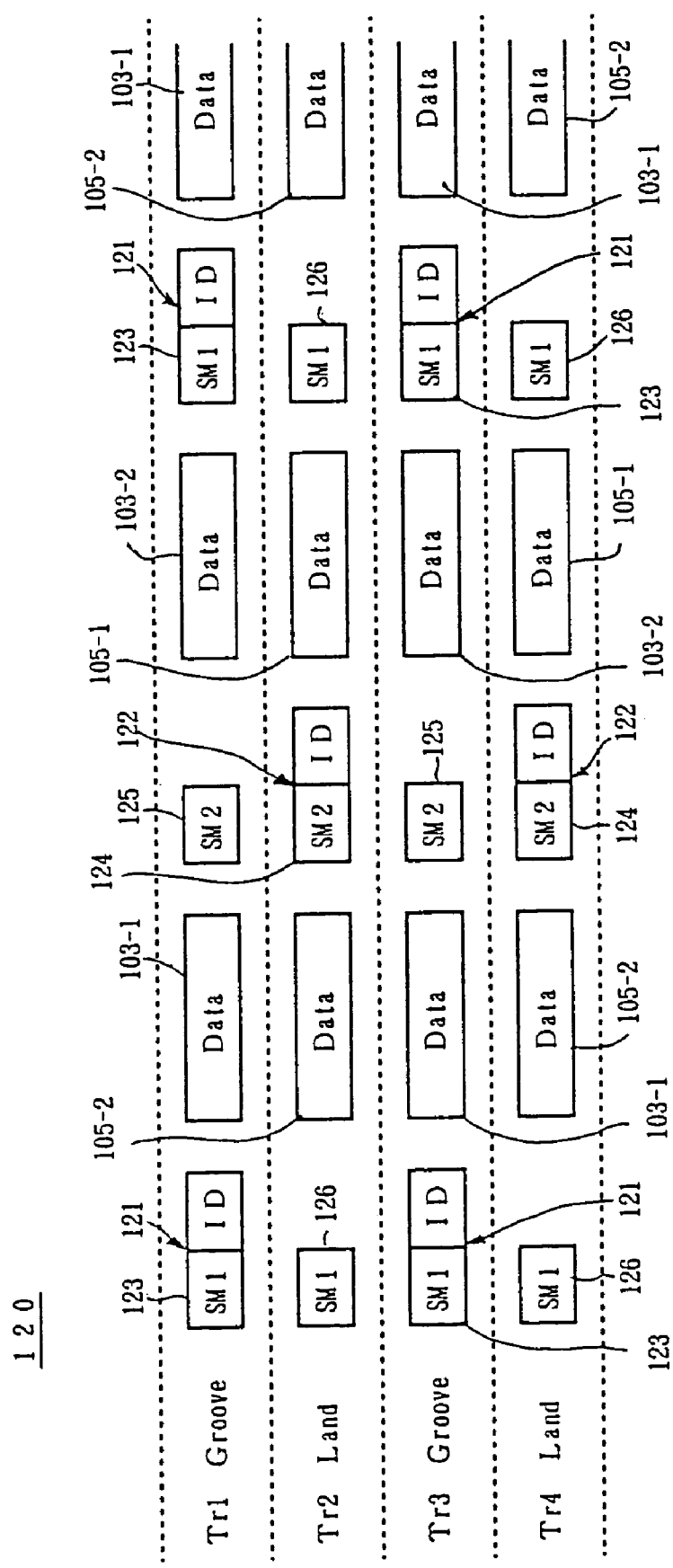
FIG. 11 shows a format of a data area in a third embodiment of the recording medium in accordance with the present invention.

FIG. 11 shows a format of a data area in a third embodiment of the recording medium in accordance with the present invention. In this figure, the same components as in FIG. 9 are denoted by the same reference numerals.

A data area 120 of this embodiment has a sector mark 123 in each header 121, a sector mark 124 in each header 122, a sector mark 125 between each two data fields 103-1 and 103-2, and a sector mark 126 between each two data fields 105-1 and 105-2. Each of the sector marks 123 and 126 has the first pattern shown in FIG. 10A, while each of the sector marks 124 and 125 has the second pattern shown in FIG. 10B.

As each of the sector marks 123 has the first pattern while each of the sector marks 124 has the second pattern in this embodiment, the sector marks can be distinguished between sectors having IDs and sectors having no IDs, and the sectors having IDs can be identified from the land and groove arrangements.

The sector marks are formed both in the lands and the grooves in this embodiment. In a land/groove medium having a track pitch smaller than the diameter of a beam, however, it is possible to form the sector marks either in the lands or the grooves and detect the sector marks both in the lands and the grooves from crosstalk.

Figure 12:
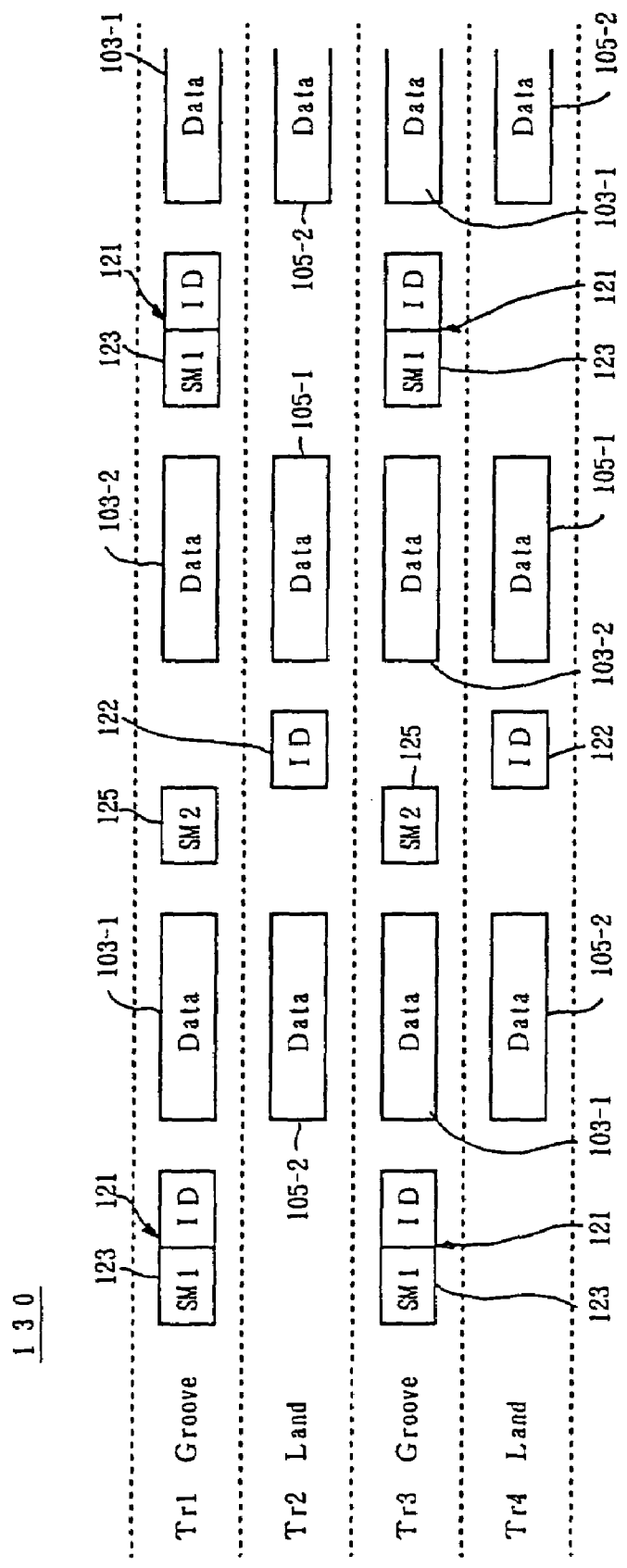
FIG. 12 shows a format of a data area in a fourth embodiment of the recording medium in accordance with the present invention.

FIG. 12 shows a format of a data area in a fourth embodiment of the recording medium in accordance with the present invention. In this figure, the same components as in FIG. 11 are denoted by the same reference numerals.

A data area 130 of this embodiment does not have the sector marks 124 and 126 of the third embodiment on the tracks Tr2 and Tr4. The sector marks 123 are of course detected at a time of groove track scanning. In this embodiment, the sector marks 123 are also detected by means of crosstalk at a time of land track scanning.

Figure 13:
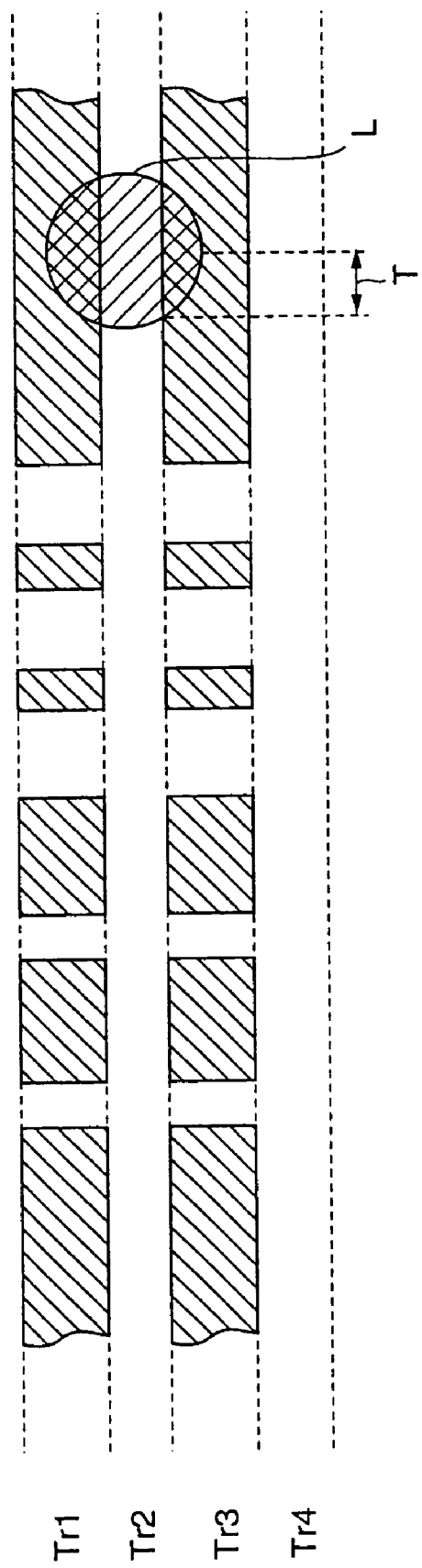
FIG. 13 shows the relationship between a light beam and sector marks in the fourth embodiment of the recording medium in accordance with the present invention.

FIG. 13 shows the size relationship between a light beam and sector marks of the fourth embodiment of the recording medium in accordance with the present invention.

In FIG. 13, sector marks are formed on the groove tracks Tr1 and Tr3, and no sector marks are formed on the land tracks Tr2 and Tr4. When a laser beam L scans the land track Tr2, the land track Tr2 comes in the center of the laser beam L, as shown in FIG. 13. Although no sector marks are formed on the land track Tr2, the laser beam L that is larger than the track pitch scans parts of the sector marks formed on the two adjacent groove tracks Tr1 and Tr3, thereby detecting the sector marks by means of crosstalk.

In accordance with this embodiment, the MSR (Magnetic Super Resolution) technique can be employed to reduce the mark size, and headers including the identifier portions can be formed by pits, without reducing the recording density. As the headers are not in line with each other on two adjacent tracks, the headers can be wider than the tracks without adverse influence to each other. Thus, the recording density can be increased even with the large pits.

Although a magneto-optical disk is employed as the recording medium in the above embodiments, the application of the present invention is not limited to magneto-optical disks. For instance, the above embodiments are applicable to a recording medium on which recording is performed by a MAMMOS technique or the like for forming marks narrower than the diameter of a laser beam.

Figure 14:
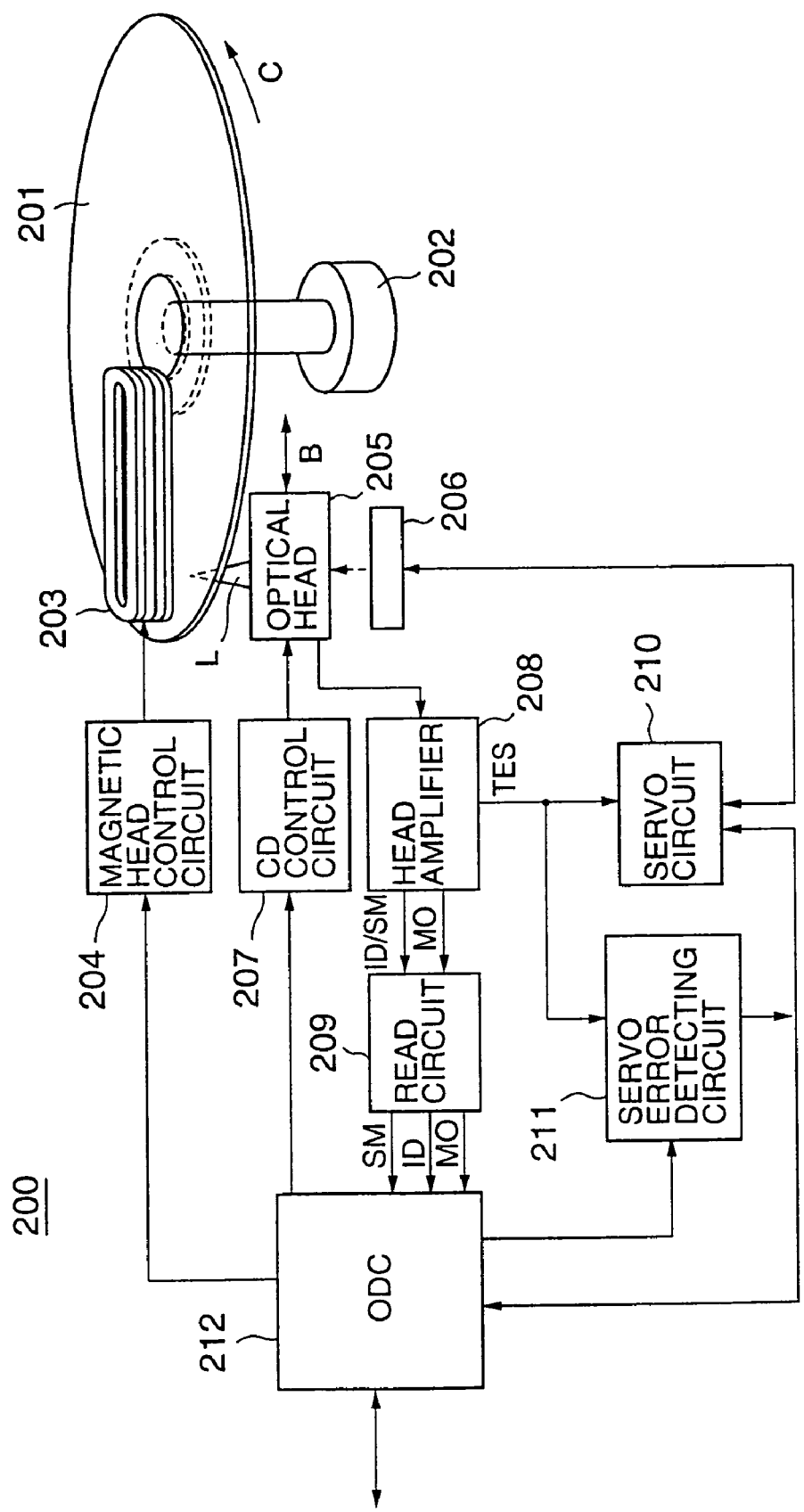
FIG. 14 is a block diagram of one embodiment of an information storage apparatus in accordance with the present invention.

FIG. 14 is a block diagram of one embodiment of an information storage apparatus in accordance with the present invention.

A magneto-optical disk device 200 of this embodiment stores information in the magneto-optical disk shown in FIGS. 5 to 13. The magneto-optical disk device 200 comprises a magneto-optical disk 201, a spindle motor 202, a magnetic head 203, a magnetic head control circuit 204, an optical head 205, a positioner 206, an LD control circuit 207, a head amplifier 208, a read circuit 209, a servo circuit 210, a servo error detecting circuit 211, and an ODC (Optical Disk Controller) 212.

The magneto-optical disk 201 has any of the formats shown in FIGS. 5 to 13. The magneto-optical disk 201 is rotated by the spindle motor 202 in a direction indicated by an arrow C. The magnetic head 203 is placed on a surface of the magneto-optical disk 201 in the radial direction (in a direction indicated by an arrow B). The magnetic head 203 applies a magnetic field to the magneto-optical disk 201 to record and reproduce information thereon.

The optical head 205 is placed on the other surface of the magneto-optical disk 102. The optical head 205 emits a light beam L onto the magneto-optical disk 201. The optical head 205 is engaged with the positioner 206, and can be moved by the positioner 206 in the radial direction of the magneto-optical disk 201 (in the direction indicated by the arrow B). The optical head 205 is connected to the LD control circuit 207, and is driven in accordance with a signal supplied from the LD control circuit 207.

The light beam L is reflected by the magneto-optical disk 201, and returned to the optical head 205. The reflected light from the magneto-optical disk 201 is then converted into reproduction signals which are supplied to the head amplifier 208. The head amplifier 208 separates a tracking error signal TES, ID and sector mark signals, and an information signal MO from the reproduction signals. The ID and sector mark signals and the information signal MO separated by the head amplifier 208 are sent to the read circuit 209. The read circuit 209 separates the ID and sector mark signals from the information signal MO, and demodulates the ID and sector mark signals as well as the information signal MO.

The ID-signal, the sector mark signal SM, and the information signal MO demodulated by the read circuit 209 are then sent to the ODC 212. In accordance with the ID signal and the sector mark signal SM, the ODC 212 determines the illumination position of the light beam on the magneto-optical disk 201, and generates a sensitivity switching signal for switching the servo sensitivity. The ODC 212 also sends the information signal MO to a host computer.

The sensitivity switching signal generated from the ODC 212 is supplied to the servo error detecting circuit 211. In accordance with the sensitivity switching signal, the servo error detecting circuit 211 controls the sensitivity for detecting a servo error from the tracking error signal TES supplied from the head amplifier 208. When the tracking error signal TES supplied from the head amplifier 208 is larger than a threshold value set by the sensitivity switching signal supplied from the ODC 212, the servo error detecting circuit 211 determines that there is a servo error, and outputs a high-level signal.

The detection result of the servo error detecting circuit 211 is supplied to the ODC 212 and the servo circuit 210. When the servo error detecting circuit 211 detects a servo error, the ODC 212 stops writing and reading operations, and the servo circuit 210 stops the servomechanism.

Figure 15:
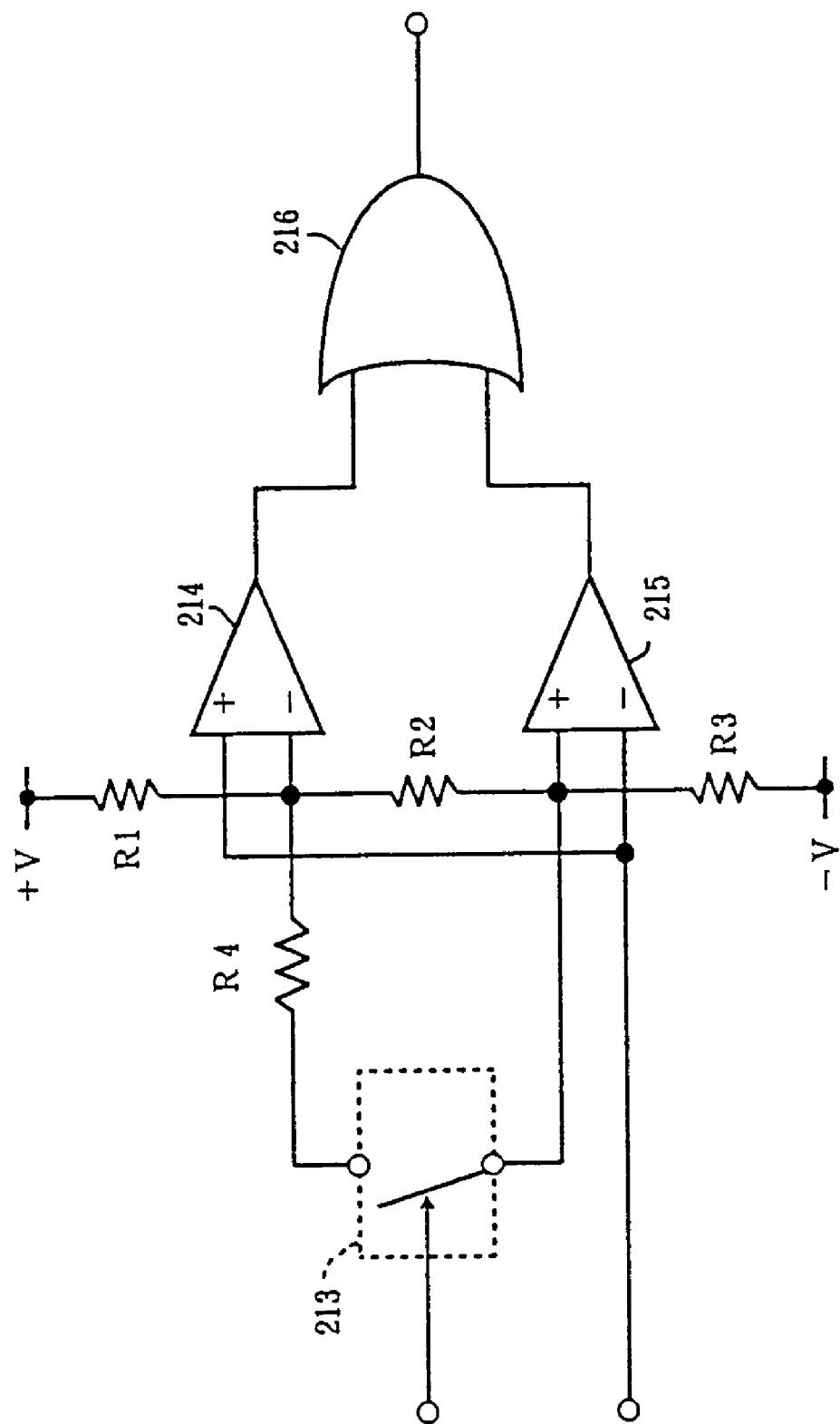
FIG. 15 is a block diagram of a servo error detecting circuit of the information storage apparatus in accordance with the present invention.

FIG. 15 is a block diagram of the servo error detecting circuit of the embodiment of the information storage apparatus in accordance with the present invention.

The servo error detecting circuit 211 comprises a switch 213, comparators 214 and 215, an OR gate 216, and resistors R1 to R4. The resistors R1 to R3 are connected in series between a voltage +V and a voltage −V of a power source. A first threshold value is generated at the connection point between the resistors R1 and R2, and a second threshold value is generated at the connection point between the resistors R2 and R3.

A series circuit made up of the switch 213 and the resistor R4 is connected to the resistor R2 in parallel. The connection of the resistor R4 to the resistor R2 is switched by switching on and off the switch 213. The switch 213 is connected to the ODC 212, and switches the connection of the resistor R4 to the resistor R2 in accordance with the sensitivity switching signal supplied from the ODC 212. When the sensitivity switching signal supplied from the ODC 212 is high, i.e., when high sensitivity is required, the switch 213 is switched on to connect the resistor R4 to the resistor R2 in parallel. When the resistor R4 and the resistor R2 are connected in parallel, the resistor R4 lowers the resistivity between the resistor R1 and the resistor R3. Accordingly, the difference between the first threshold value and the second threshold value becomes smaller, and the sensitivity becomes higher. When the sensitivity switching signal supplied from the ODC 212, i.e., when low sensitivity is required, the switch 213 is switched off to leave only the resistor R2 between the resistor R1 and the resistor R3. With only the resistor R2 being connected between the resistor R1 and the resistor R3, the resistivity between the resistor R1 and the resistor R3 becomes higher. Accordingly, the difference between the first threshold value and the second threshold value becomes larger, and the sensitivity becomes lower.

The first threshold value outputted from the connection point between the resistor R1 and the resistor R2 is supplied to the inverting input terminal of the comparator 214. The second threshold value outputted from the connection point between the resistor R2 and the resistor R3 is supplied to the non-inverting input terminal of the comparator 215.

The servo error signal TES outputted from the head amplifier 208 is supplied to the non-inverting input terminal of the comparator 214. The comparator 214 compares the servo error signal TES with the first threshold value. When the servo error signal TES is smaller than the first threshold value, the output of the comparator 214 is low. When the servo error signal TES is larger than the first threshold value, the output of the comparator 214 is high.

The servo error signal TES outputted from the head amplifier 208 is also supplied to the inverting input terminal of the comparator 215. The comparator 215 compares the servo error signal TES with the second threshold value. When the servo error signal TES is larger than the second threshold value, the output of the comparator 215 is low. When the servo error signal TES is smaller than the second threshold value, the output of the comparator 215 is high.

The outputs of the comparators 214 and 215 are supplied to the OR gate 216. The OR gate 216 outputs the OR logic between the outputs of the comparators 214 and 215. The output of the OR gate 216 is supplied as the output of the servo error detecting circuit 211 to the ODC 212 and the servo circuit 210.

The ODC 212 detects the address from a header on the magneto-optical disk 201, and counts the number of data fields that have passed. In accordance with the detected address from the header and the number of data fields that have passed, the ODC 212 identifies the address of a data field without a header, and then reads or writes. For instance, the ODC 212 adds the number of data fields that have passed to the detected address so as to determine the address of the data field without a header.

Figure 16:
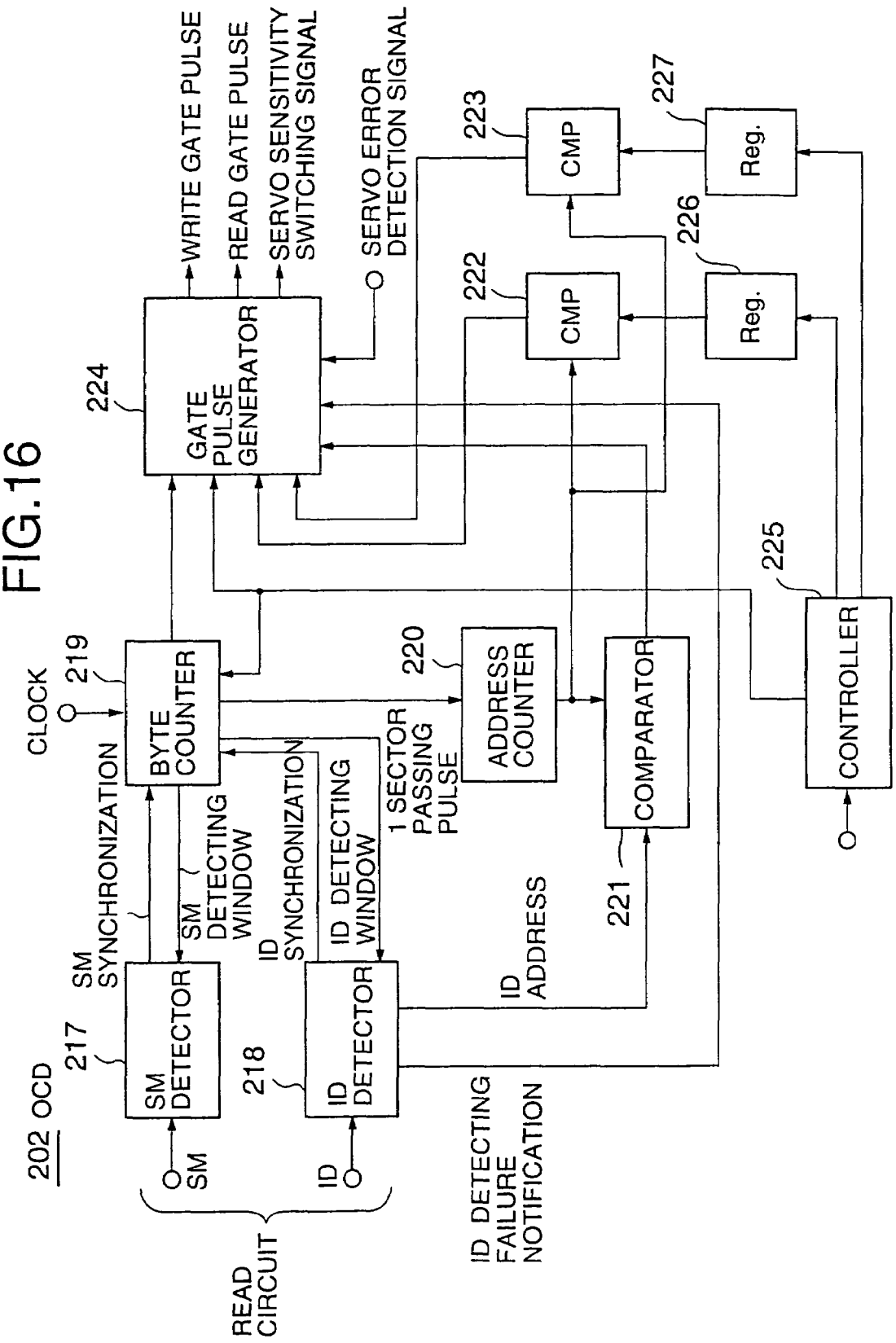
FIG. 16 is a block diagram of an ODC of the information storage apparatus in accordance with the present invention.

FIG. 16 is a block diagram of the ODC of the embodiment of the information storage apparatus in accordance with the present invention.

The ODC 212 comprises a sector mark detector 217, an ID detector 218, a byte counter 219, an address counter 220, comparators 221, 222, and 223, a gate pulse generator 224, a controller 225, and registers 226 and 227.

The sector mark detector 217 detects a sector mark signal SM supplied from the read circuit 209, and sends a sector mark synchronizing signal in synchronization with the sector mark signal SM to the byte counter 219. The ID detector 218 detects an ID address from the ID signal supplied from the read circuit 209, and sends the ID address to the comparator 221. The ID detector 218 also sends an ID synchronizing signal in synchronization with the ID signal to the byte counter 219. When the ID address is not detected, the ID detector 218 sends an ID detection failure notification to the gate pulse generator 224.

The byte counter 219 counts in accordance with a synchronizing event, and outputs a signal corresponding to the selected synchronizing event. More specifically, the byte counter 219 counts the sector mark synchronizing signal supplied from the sector mark detector 217 and the ID synchronizing signal supplied from the ID detector 218 as synchronizing events. In accordance with the count result, the byte counter 219 supplies a sector mark detecting window to the sector mark detector 217, and an ID detecting window to the ID detector 218.

The byte counter 219 also detects each sector that has passed, based on the count result. A 1-sector pass notification is supplied to the address counter 220 every time one sector passes. The address counter 220 counts the 1-sector pass notifications supplied from the byte counter 219, and generates an extrapolated address from the ID address of a sector without an ID address. The extrapolated address generated by the address counter 220 is supplied to the comparators 221, 22, and 223.

The comparator 221 compares the ID address supplied from the ID detector 218 with the extrapolated address supplied from the address counter 220, and outputs a signal in accordance with the comparison result. When the ID address is not identical with the extrapolated address, the output signal of the comparator 221 is high. When the ID address is identical with the extrapolated address, the output signal of the comparator 221 is low. The output signal of the comparator 221 is supplied to the gate pulse generator 224.

The comparator 222 compares the extrapolated address supplied from the address counter 220 with a process start sector address stored in the register 226, and outputs a signal in accordance with the comparison result. When the extrapolated address supplied from the address counter 220 is identical with the process start sector address supplied from the register 226, the output signal of the comparator 222 is high. When the extrapolated address supplied from the address counter 220 is not identical with the process start sector address supplied from the register 226, the output signal of the comparator 222 is low. The output signal of the comparator 222 is supplied to the gate pulse generator 224. In accordance with the output signal, the gate pulse generator 224 detects a process start position.

The comparator 223 compares the extrapolated address supplied from the address counter 220 with a process end sector address stored in the register 227, and outputs a signal in accordance with the comparison result. When the extrapolated address supplied from the address counter 220 is identical with the process end sector address supplied from the register 227, the output signal of the comparator 223 is high. When the extrapolated address supplied from the address counter 220 is not identical with the process end sector address supplied from the register 227, the output signal of the comparator 223 is low. The output signal of the comparator 223 is supplied to the gate pulse generator 224. In accordance with the output signal, the gate pulse generator 224 detects a process end position.

The register 226 is connected to the controller 225. The controller 225 supplies the process start address to the register 226. The register 227 is also connected to the controller 225. The controller 225 supplies the process end address to the register 227.

The gate pulse generator 224 generates a write gate pulse, a read gate pulse, and a servo sensitivity switching signal, based on the count value supplied from the byte counter 219, and on the process start address and the process end address supplied from the comparators 222 and 223, respectively. If the ID detection failure notification is supplied from the ID detector 218 to the gate pulse generator 224, the gate pulse generator 224 stops the gate pulse generating operation.

Figure 17:
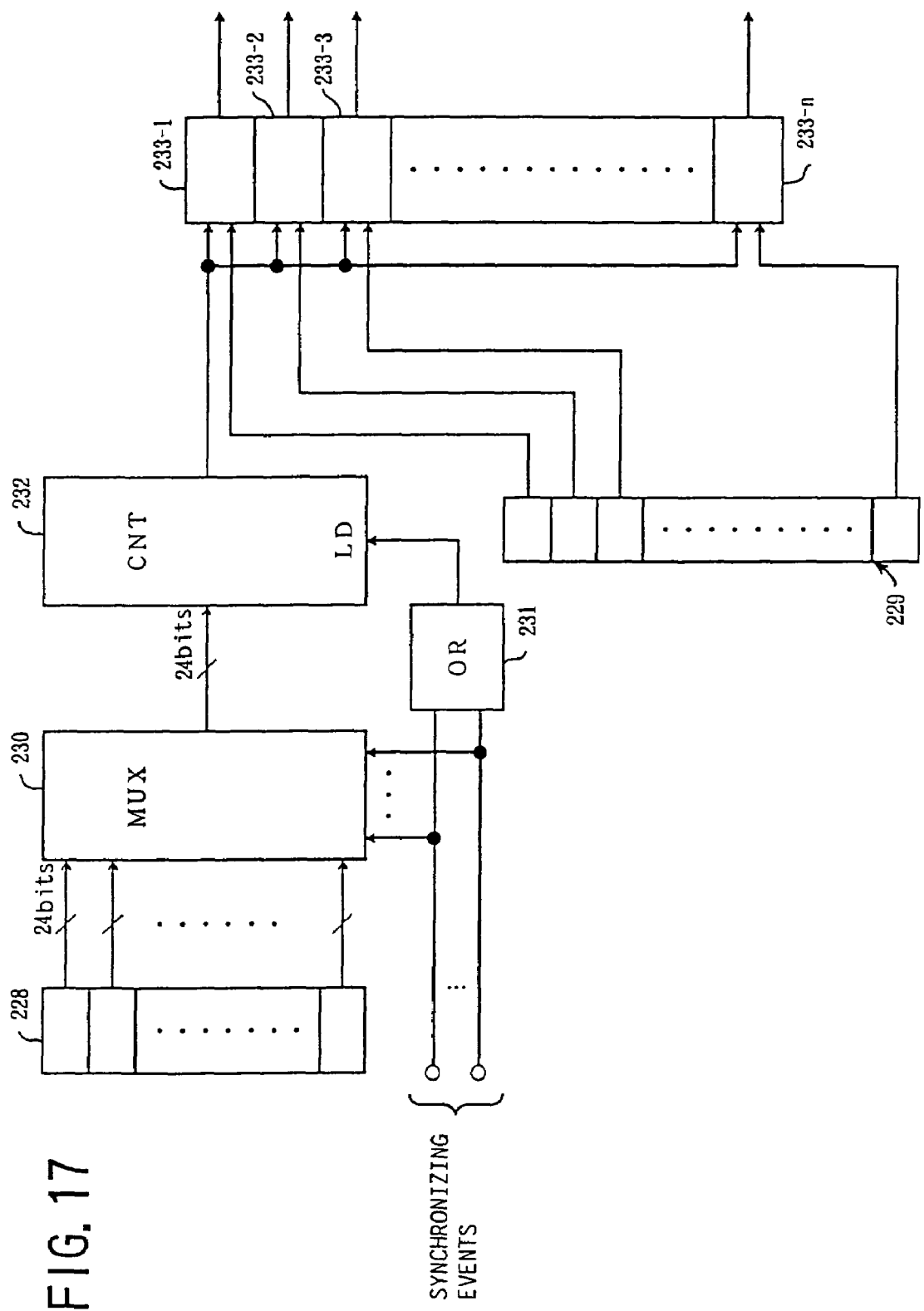
FIG. 17 is a block diagram of a byte counter of the information storage apparatus in accordance with the present invention.

FIG. 17 is a block diagram of the byte counter of the embodiment of the information storage apparatus in accordance with the present invention.

The byte counter 219 comprises registers 228 and 229, a multiplexer 230, an OR gate 231, a counter 232, and comparators 233-1 to 233-n.

The register 228 holds synchronizing values as timing values for generating synchronizing events. The synchronizing values stored in the register 228 are supplied to the multiplexer 230. The multiplexer 230 receives a synchronizing event as well as the synchronizing values from the register 228. The synchronizing event is a signal which is high when the read gate pulse, the write gate pulse, or the servo sensitivity pulse switching signal is generated, and which is low when the pulse generating operation is stopped.

The multiplexer 230 selects a desired synchronizing value from the register 228 in accordance with the supplied synchronizing event, and sends the selected synchronizing value to the counter 232. The synchronizing event is also supplied to the OR gate 231, which generates the OR logic of the synchronizing event. The output of the OR gate 231 is supplied to the counter 232. The counter 232 starts counting from the synchronizing value selected by the multiplexer 230. The count value of the counter 232 is supplied to the comparators 233-1 to 233-n.

Each of the comparator 233-1 to 233-n receives the count value from the counter 232 and a timing value from the register 229. The timing values, each of which represents the count value for generating each synchronizing event, are stored in the register 229 in advance.

Each of the comparators 233-1 to 233-n compares the count value from the counter 232 with the timing value from the register 229, and outputs a signal in accordance with the comparison result. When the count value from the counter 232 is identical with the timing value from the register 229, the output signal of each of the comparators 233-1 to 233-n is high. When the count value from the counter 232 is not identical with the timing value from the register 229, the output signal of each of the comparators 233-1 to 233-n is low.

In the above manner, each of the comparators 233-1 to 233-n outputs a signal that is high when an event should be generated. The outputs of the comparators 233-1 to 233-n are supplied to the sector mark detector 217, the ID detector 218, the address counter 220, and the gate pulse generator 224.

Figure 18:
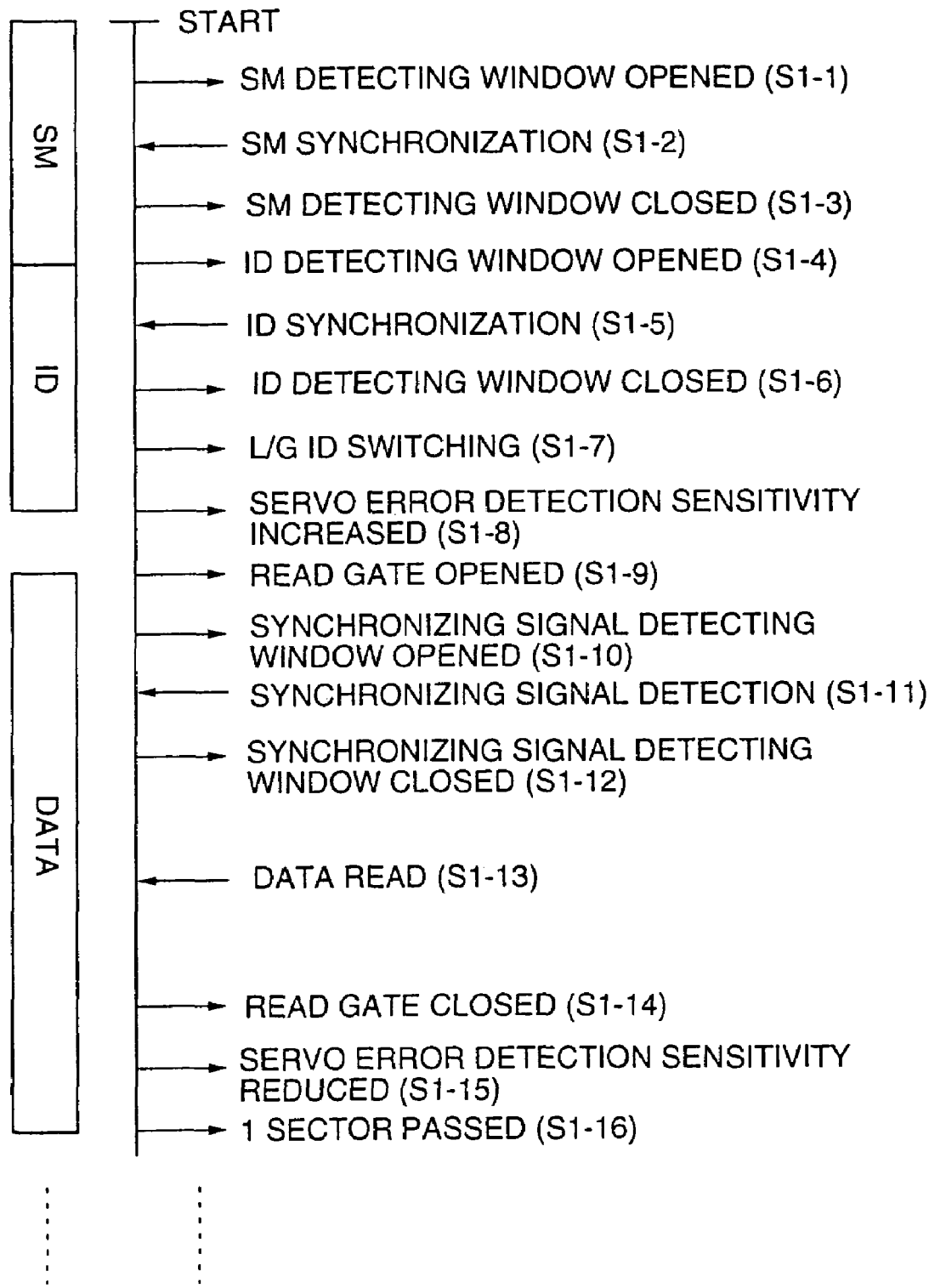
FIG. 18 shows the procedures for generating an event in the information storage apparatus in accordance with the present invention.

FIG. 18 shows the procedures for generating an event in the embodiment of the information storage apparatus in accordance with the present invention. The event explained with reference to FIG. 18 is an information read event.

First, as the light beam reaches a position in which a sector mark is recorded, the ODC 212 opens the sector mark detecting window in step S1-1. With the sector mark detecting window being open, the sector mark becomes detectable. If the sector mark signal is in synchronization with the sector mark detecting window here, the sector mark can be read in step S1-2. The sector mark detecting window is then closed in step S1-3. Here, the period of the sector mark detecting window is longer than the period of the sector mark. For instance, if the period of the sector mark is 5 bytes, the period of the sector mark detecting window is 8 bytes, being expanded by 3 bytes before and after the sector mark. Thus, the servo mark is situated within the servo mark detecting window, and accurate detection of the sector mark is ensured.

After the sector mark detecting window is closed in the step S1-3, the ID detecting window is opened in step S1-4. With the ID detecting window being open, an ID becomes detectable. If the ID signal is in synchronization with the ID detecting window here, the ID can be read in step S1-5. The justification of the ID detection is determined by a CRC (cyclic redundancy check) attached to each ID. If the ID is detected and the CRC attached to the ID is determined to be normal, the ID detecting window is closed in step S1-6. Here, the period of the ID detecting window is longer than the period of ID.

After the ID detecting window is closed, whether the detected ID belongs to a land or a groove is determined in step S1-7.

Next, the servo error detection sensitivity is increased in step 1-8, and a read gate is opened in step S1-9. A synchronizing signal detecting window is then opened, and a synchronizing signal becomes detectable in step S1-10. If the synchronizing signal is in synchronization with the synchronizing signal detecting window, the synchronizing signal is read out in step S1-11. The synchronizing signal detecting window is then closed in step S1-12. Here, the period of the synchronizing signal detecting window is longer than the period of the synchronizing signal.

After the synchronizing signal detecting window is closed, data is read out in step S1-13. After the data is read out, the read gate is closed in step S1-14. The servo error detection sensitivity is then reduced, and the servo is stabilized in step S1-15. Here, the read gate open period is longer than the period of the read data. Thus, the data of one sector has been read, and the light beam has passed the sector in the S1-16.

When writing information, instead of reading it, the write gate is opened in the step S1-9, and is closed in the step S1-14. The synchronizing signal detection of the steps S1-10 to S1-12 is skipped. The write gate open period is also longer than the period of the written data.

In the above manner, read and write cycles are performed on the tracks Tr1, Tr2, Tr3, Tr4, . . .

In this embodiment, there are data areas with no header. Therefore, it is necessary to prevent the ID read gate from being switched on in those data areas.

Figure 19:
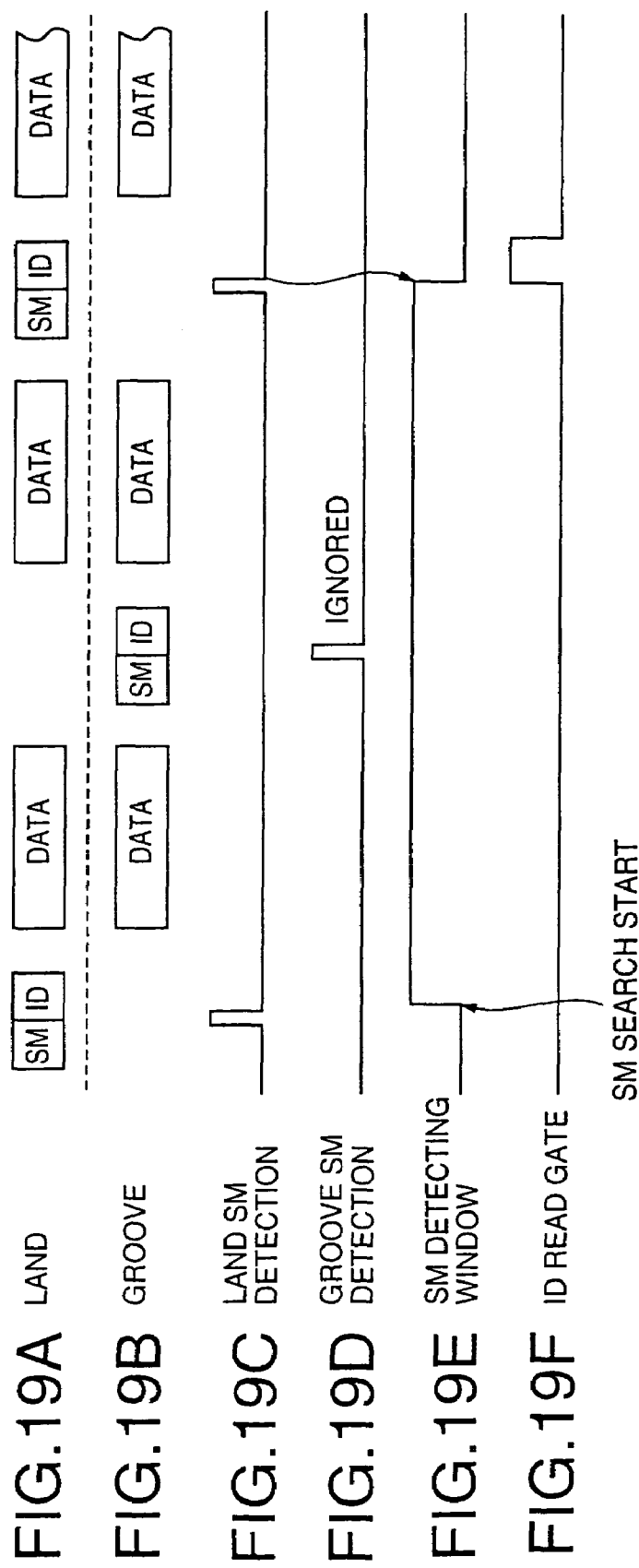
FIGS. 19A to 19F show an ID readout operation at a time of land track access in the information storage apparatus in accordance with the present invention.

FIGS. 19A to 19F show an operation of the ODC in the embodiment of the information storage apparatus in accordance with the present invention. FIG. 19A shows the data format of a land, FIG. 19B shows the data format of a groove, FIG. 19C shows a land sector mark detection pulse, FIG. 19D shows a groove sector mark detection pulse, FIG. 19E shows a sector mark detecting window, and FIG. 19F shows an ID read gate.

The magneto-optical disk 201 used in this embodiment has lands formatted as shown in FIG. 19A, and grooves formatted as shown in FIG. 19B. In the magneto-optical disk 201, each land track is in very close proximity with each adjacent groove track. Because of this, when scanning a land track, a groove ID might be wrongly read out. This embodiment is to prevent such an error.

When searching for a sector mark on the land track shown in FIG. 19A, sector marks detected from the groove track shown in FIG. 19B should be ignored. Therefore, when the sector mark detection is started as shown in FIG. 19E, the sector mark detection pulse on the groove track shown in FIG. 19D is ignored. When a sector mark on the land track is detected as shown in FIG. 19C, the sector mark detecting window is closed as shown in FIG. 19E, and the ID read gate is opened as shown in FIG. 19F. Since the ID read gate is opened only when the sector mark in a header on the land track is detected, the ID read gate is never wrongly opened when the sector mark in a header on the groove track is detected. Thus, reading the ID on the groove track shown in FIG. 19B due to crosstalk can be prevented.

Figure 20:
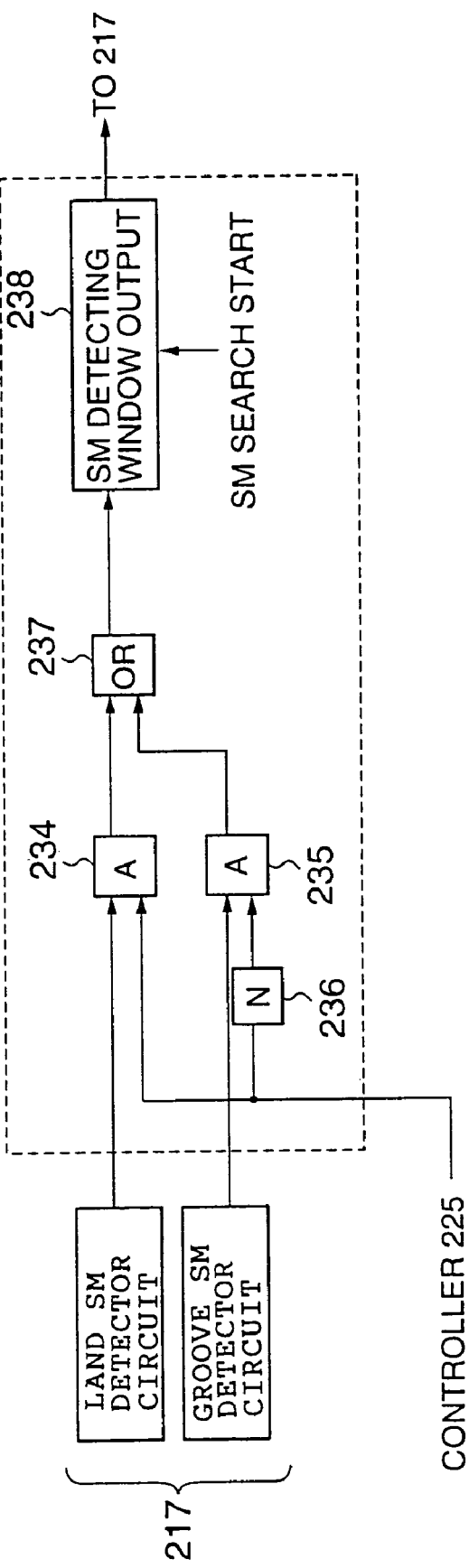
FIG. 20 is an equivalent circuit for generating a sector mark detecting window of the information storage apparatus in accordance with the present invention.

FIG. 20 is an equivalent circuit of an operation of the ODC of the information storage apparatus in accordance with the present invention. The processes shown in FIGS. 19A to 19F are realized by the equivalent circuit of FIG. 20.

As shown in FIG. 20, the equivalent circuit comprises AND gates 234 and 235, a NOT circuit 236, an OR gate 237, and a sector mark detecting window output part 238.

The AND gate 234 receives a land sector mark detection pulse from the sector mark detector 217 and a land tracking signal from the controller 225. The AND gate 234 then determines the AND logic between the land sector mark detection pulse and the land tracking signal. The AND gate 235 receives a groove sector mark detection pulse from the sector mark detector 217 and the land tracking signal inverted by the NOT circuit 236. The AND gate 235 then determines the AND logic between the groove sector mark detection pulse and the inverted land tracking signal.

The outputs of the AND gates 234 and 235 are supplied to the OR gate 237, which determines the OR logic between the output of the AND gate 234 and the output of the AND gate 235. The output of the OR gate 237 is supplied to the sector mark detecting window output part 238. In accordance with the signal supplied from the OR gate 237, the sector mark detecting window output part 238 closes the sector mark detecting window. Meanwhile, the sector mark detecting window output part 238 receives a sector mark search start pulse generated as an event inside the byte counter 219. In accordance with the sector mark search start pulse, the sector mark detecting window output part 238 opens the sector mark detecting window. In accordance with the signal supplied from the OR gate 237, the sector mark detecting window output part 238 closes the sector mark detecting window. The sector mark detecting window outputted from the sector mark detecting window output part 238 is supplied to the sector mark detector 217. In accordance with the sector mark detecting window supplied from the sector mark detecting window output part 238, the sector mark detector 217 controls the sector mark detection. Also, in accordance with the sector mark detecting window supplied from the sector mark detecting window output part 238, the timing of the ID detecting window is controlled as shown in FIG. 19F.

In the above manner, detecting a groove track ID due to crosstalk at a time of land track scanning can be prevented.

Since only one ID is set for two sectors in the magneto-optical disk 201 of this embodiment, a sector mark should be detected both in a data area on the land and a corresponding data area on the groove. The sector marks detected from both data areas are then compounded into a compound sector mark. By counting the compound sector marks, a one sector passing pulse is generated. Thus, accurate counting of the sectors can be performed.

Figure 21:
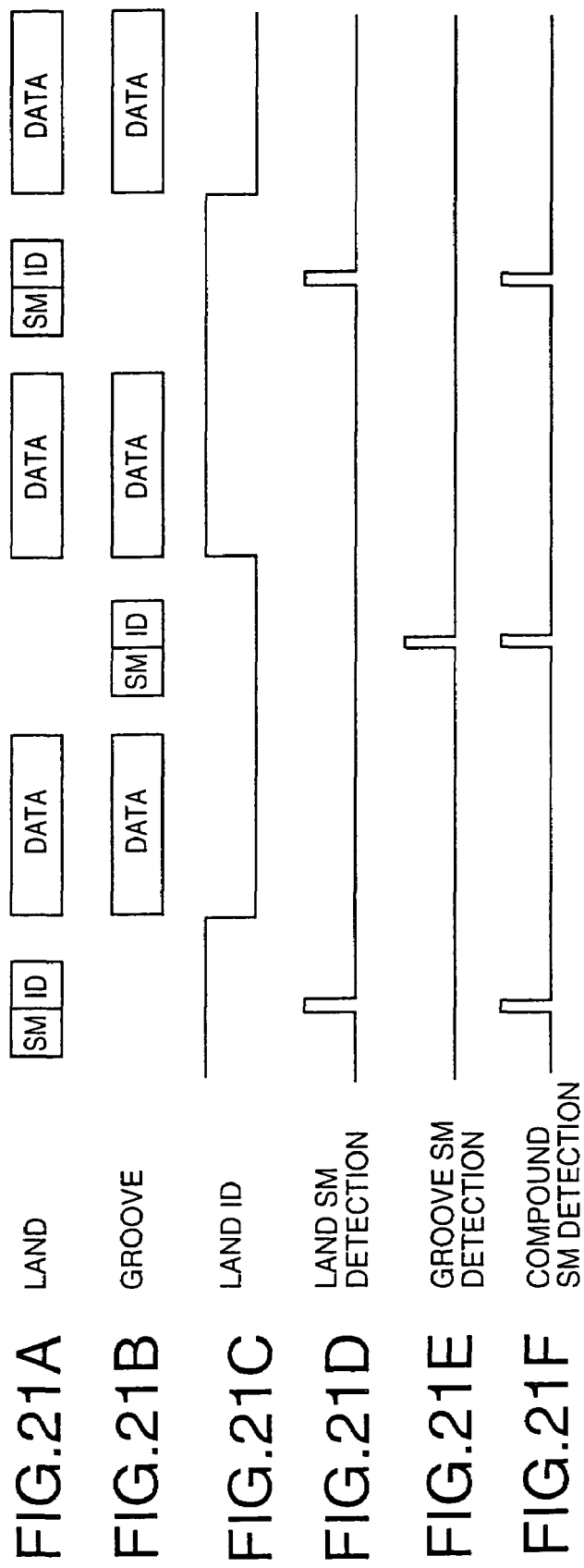
FIGS. 21A to 21F show a process for generating a compound sector mark in the information storage apparatus in accordance with the present invention.

FIGS. 21A to 21F illustrate a process for generating one sector passing pulse in the information storage apparatus of the present invention. More specifically, FIG. 21A shows a format of a land track, FIG. 21B shows a format of a groove track, FIG. 21C shows a land ID read gate, FIG. 21D shows a land sector mark detecting pulse, FIG. 21E shows a groove sector mark detection pulse, and FIG. 21F shows a compound sector mark detection pulse.

A land sector mark is first detected in a header in the land format shown in FIG. 21A. The land sector mark detection pulse shown in FIG. 21D is then generated. Also, a groove sector mark is detected in a header in the groove format shown in FIG. 21B, and the groove sector mark detection pulse shown in FIG. 21E is then generated.

The land mark detection pulse shown in FIG. 21D and the groove sector mark detection pulse shown in FIG. 21E are compounded into the compound sector mark detection pulse shown in FIG. 21F.

Figure 22:
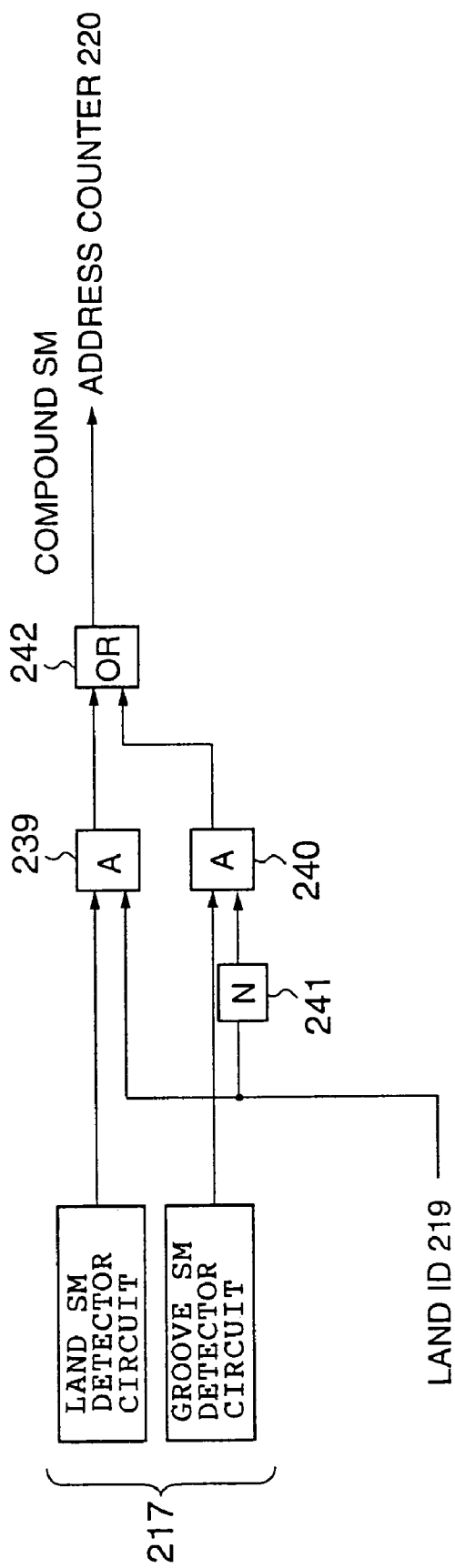
FIG. 22 is an equivalent circuit for generating a compound sector mark in the information storage apparatus in accordance with the present invention.

FIG. 22 is an equivalent circuit for generating a compound sector mark in the information storage apparatus of the present invention.

The sector mark compounding circuit shown in FIG. 22 comprises AND gates 239 and 240, a NOT circuit 241, and an OR gate 242. The AND gate 239 receives the land sector mark detection pulse from the sector mark detector 217 and the ID detecting window generated from the byte counter 219. The AND gate 239 then determines the AND logic between the land sector mark detection pulse and the ID detecting window. The output of the AND gate 239 is shown in FIG. 21D.

The AND gate 240 receives the groove sector mark detection pulse from the sector mark detector 217 and the ID detecting window generated from the byte counter 219. The AND gate 240 then determines the AND logic between the groove sector mark detection pulse and the ID detecting window. The output of the AND gate 240 is shown in FIG. 21E.

The outputs of the AND gates 239 and 240 are supplied to the OR gate 242. The OR gate 242 outputs the OR logic between the output of the AND gate 239 and the output of the AND gate 240. The output of the OR gate 242 is shown in FIG. 21F.

In the above manner, a pulse is outputted in every data area, i.e., in every sector. The pulse is then supplied as the one sector passing pulse to the address counter 220.

In a case where the sector marks formed on groove tracks are shared with land tracks, as shown in FIG. 13, the sector marks on the two groove tracks Tr1 and Tr3 are detected with the right and left side ends of the light beam L, which is scanning the land track Tr2. Accordingly, delay is caused, compared with a case where a sector mark is detected with the center of the light beam L. In the magneto-optical disk 201 of this embodiment, only one ID is set for two data areas. Therefore, it is important to obtain the accurate number of sectors to determine the address of a data area with no ID. Accordingly, the pulse width of the sector mark detection pulse needs to be corrected.

Figure 23:
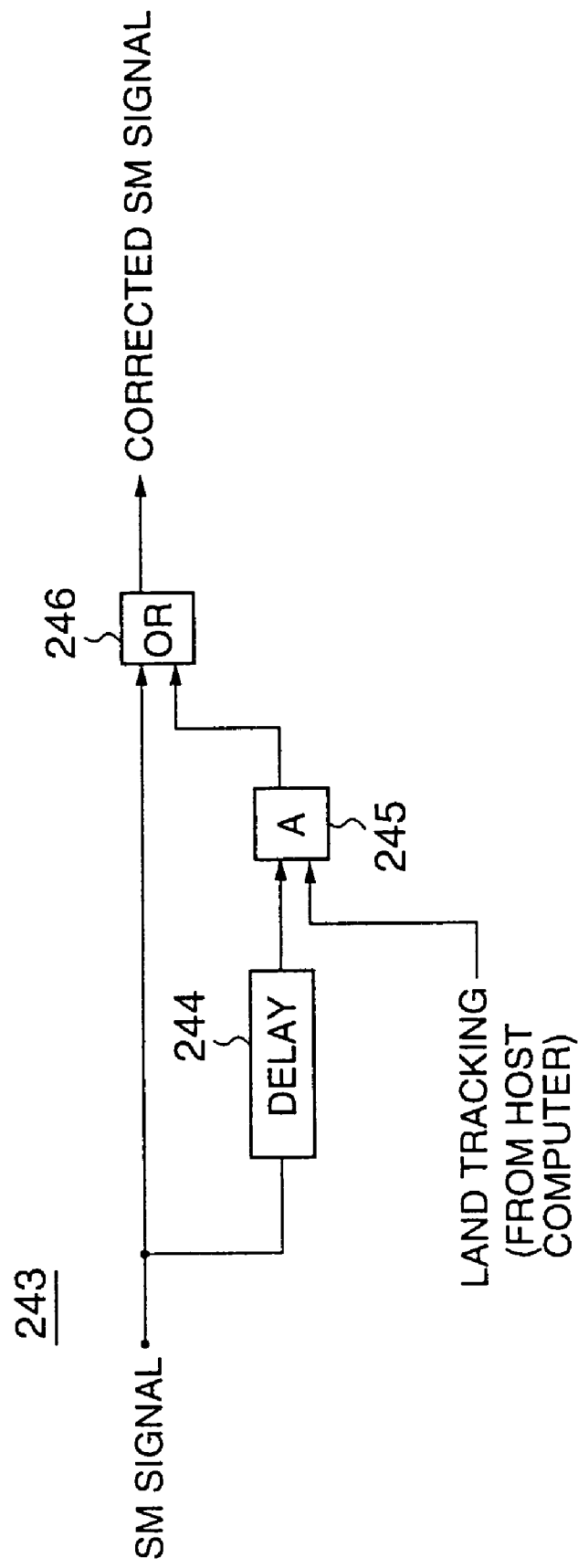
FIG. 23 is an equivalent circuit for correcting a sector mark detection pulse in the information storage apparatus in accordance with the present invention.

FIG. 23 is a block diagram of a sector mark detection pulse correction circuit of the information storage apparatus in accordance with the present invention.

The sector mark detection pulse correction circuit 243 is connected to the output terminal of the sector mark compounding circuit shown in FIG. 22, for instance. The sector mark detection pulse correction circuit 243 comprises a delay circuit 244, an AND gate 245, and an OR gate 246.

The delay circuit 244 receives the output of the sector mark compounding circuit, i.e., the signal shown in FIG. 21F, and delays the received signal by a predetermined time. The delay time is determined based on the delay distance T from the center end of the light beam L to the point where the sector mark on the groove track crosses the peripheral end of the light beam L, as shown in FIG. 13.

The output of the delay circuit 244 is supplied to the AND gate 245. The AND gate 245 also receives a land tracking signal from the controller 225, which is high at a time of land track scanning. The AND gate 245 then outputs the AND logic between the output of the delay circuit 244 and the land tracking signal. Thus, the output of the delay circuit 244 can be controlled in accordance with the land tracking signal.

The output of the AND gate 245 is supplied to the OR gate 246. The OR gate 246 also receives the output of the sector mark compounding circuit, i.e., the signal shown in FIG. 21F. The OR gate 246 then outputs the OR logic between the output of the AND gate 245 and the output of the sector mark compounding circuit.

In the above manner, the sector mark detection pulse correction circuit 243 makes the pulse width of the sector mark detection pulse at the time of land track scanning equal to the pulse width of the sector mark detection pulse at the time of groove track scanning. Thus, in the case where the sector marks on the groove tracks are shared with the land tracks, as shown in FIG. 13, accurate sector mark detection can be performed.

Figure 24:
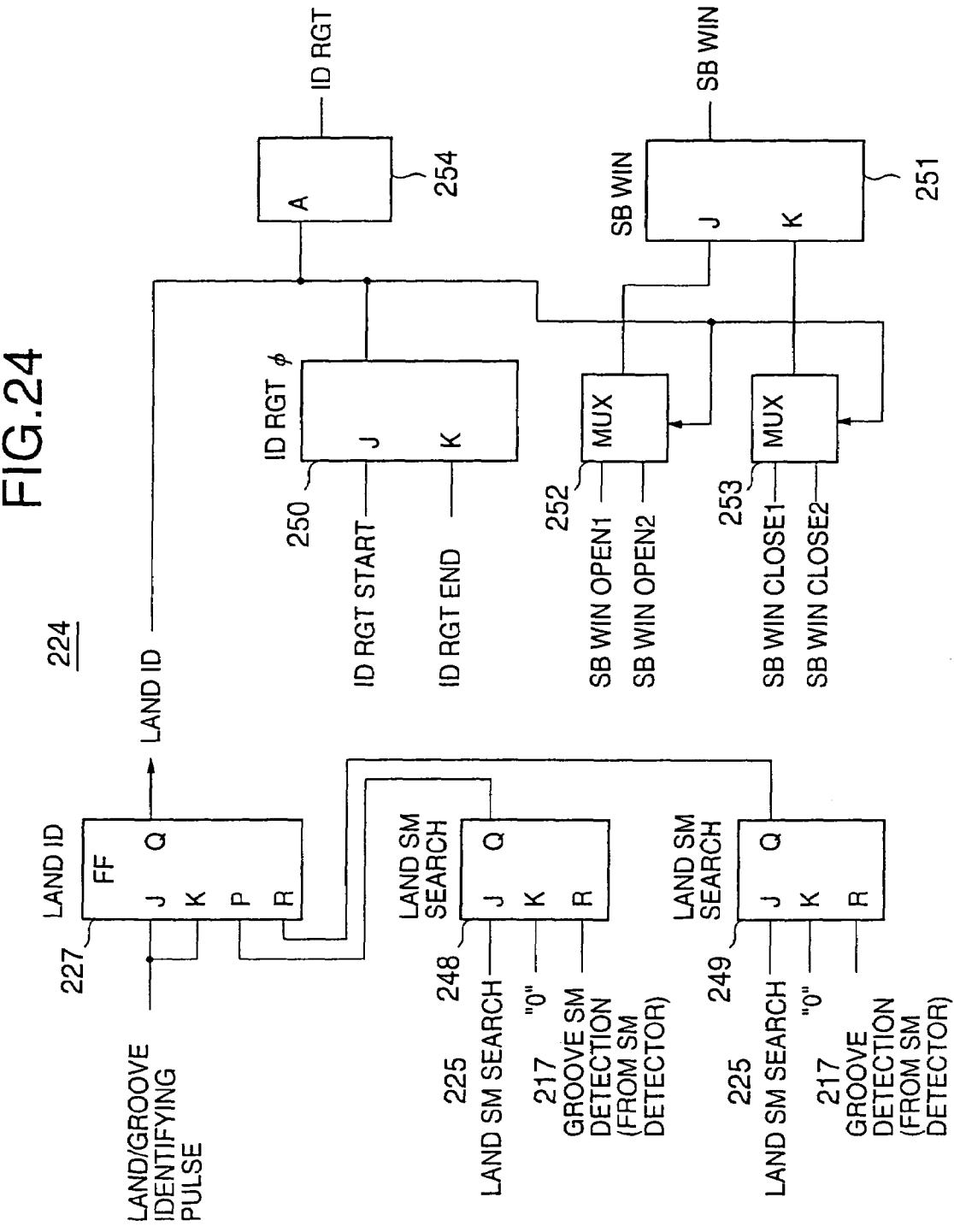
FIG. 24 is an equivalent circuit of a gate pulse generator of the information storage apparatus in accordance with the present invention.

FIG. 24 is a block diagram of the gate pulse generator of the information storage apparatus in accordance with the present invention.

The gate pulse generator 224 comprises flip-flops 247 to 251, multiplexers 252 and 253, and an AND gate 254.

Each of the flip-flops 247 to 251 has a J–K flip-flop function.

In the flip-flop 248, the land sector mark search start pulse is supplied from the controller 225 to the J input terminal. The K input terminal is fixed at "0". The land sector mark detection pulse is supplied from the sector mark detector 217 to the R input terminal. The flip-flop 248 outputs a land sector mark search pulse.

In the flip-flop 249, the groove sector mark search start pulse is supplied from the controller 225 to the J input terminal. The K input terminal is fixed at "0". The groove sector mark detection pulse is supplied from the sector mark detector 217 to the R input terminal. The flip-flop 249 outputs a groove sector mark search pulse.

In the flip-flop 247, a land/groove identifying pulse is supplied from the byte counter 219 to the J and K input terminals. The output of the flip-flop 248 is supplied to the P input terminal, and the output of the flip-flop 249 is supplied to the R input terminal. The flip-flop 247 then generates a land ID gate pulse. The land ID gate pulse is supplied to the multiplexers 252 and 253, and the AND gate 254.

In the flip-flop 250, an ID read gate open pulse is supplied from the byte counter 219 to the J input terminal, and an ID read gate close pulse is supplied from the byte counter 219 to the K input terminal. The flip-flop 250 then generates an ID read gate pulse based on the ID read gate open pulse and the ID read gate close pulse supplied from the byte counter 219.

The output of the flip-flop 250 is supplied to the AND gate 254. The AND gate 254 outputs the AND logic between the output of the flip-flop 247 and the output of the flip-flop 250. The flip-flop 250 outputs only the land ID read gate pulse of the ID read gate pulse.

The multiplexer 252 receives first and second synchronizing signal window open pulses from the byte counter 219. In accordance with the land ID gate pulse supplied from the flip-flop 247, the multiplexer 252 selectively supplies either the first synchronizing signal window open pulse or the second synchronizing signal window open pulse to the flip-flop 251. More specifically, when the land ID gate pulse supplied from the flip-flop 247 is high, the multiplexer 252 selects the first synchronizing signal window open pulse, and when the land ID gate pulse is low, the multiplexer 252 selects the second synchronizing signal window open pulse.

The multiplexer 253 receives first and second synchronizing signal window close pulse from the byte counter 219. In accordance with the land ID gate pulse supplied from the flip-flop 247, the multiplexer 253 selectively supplies either the first synchronizing signal window close pulse or the second synchronizing signal window close pulse to the flip-flop 251. More specifically, when the land ID gate pulse supplied from the flip-flop 247 is high, the multiplexer 253 selects the first synchronizing signal window close pulse, and when the land ID gate pulse is low, the multiplexer 253 selects the second synchronizing signal window close pulse.

In the flip-flop 251, the selective output of the multiplexer 252 is supplied to the J input terminal, while the selective output of the multiplexer 253 is supplied to the K input terminal. The flip-flop 251 then outputs a synchronizing signal window. When the land ID gate pulse is high, the synchronizing signal window becomes high with the first synchronizing signal window open pulse, and becomes low with the first synchronizing signal window close pulse. When the land ID gate pulse is low, the synchronizing signal window becomes high with the second synchronizing signal window open pulse, and becomes low with the second synchronizing signal window close pulse.

Figure 25:
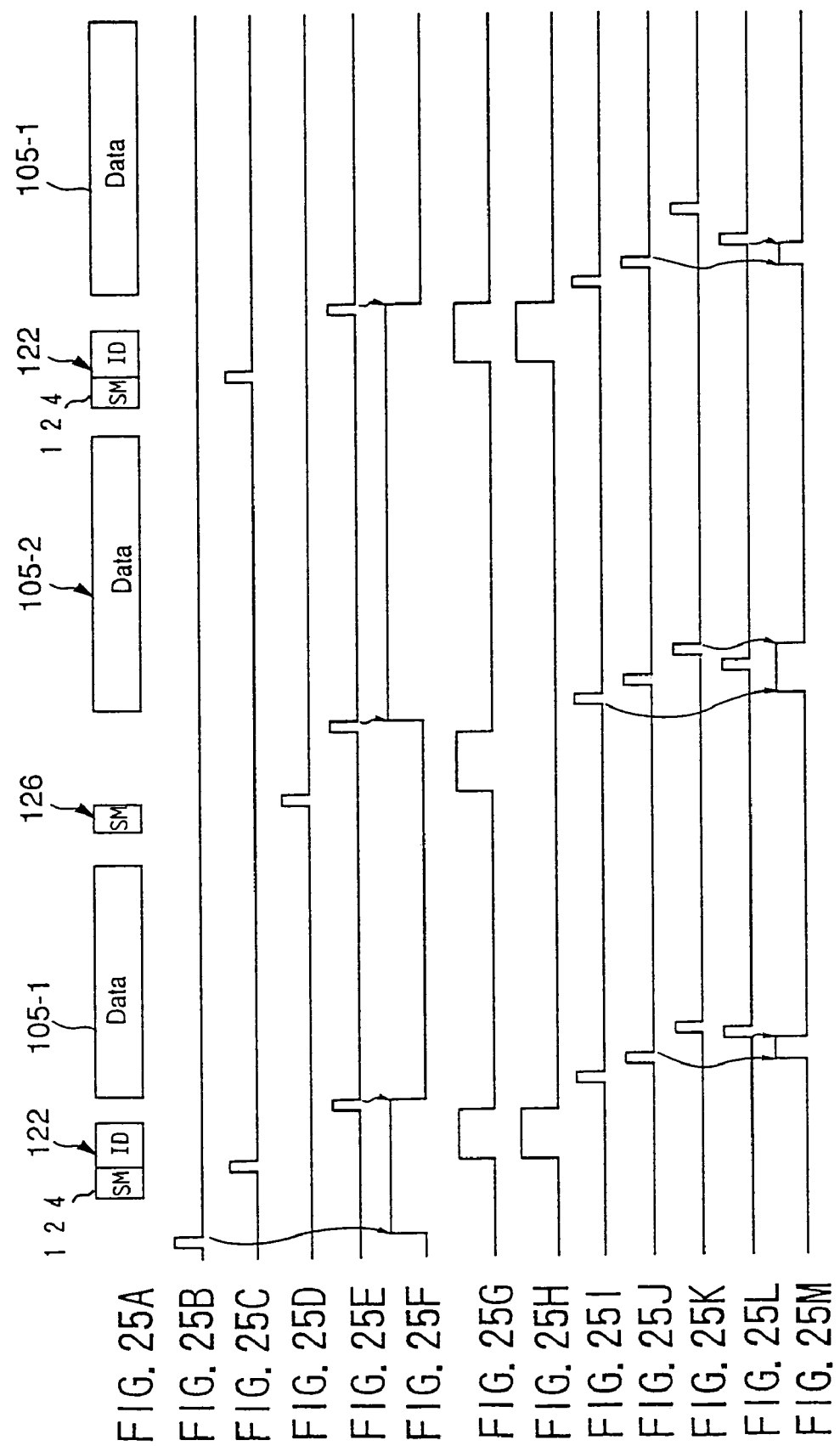
FIGS. 25A to 25M illustrate an operation of the gate pulse generator of the information storage apparatus in accordance with the present invention.

FIGS. 25A to 25M show an operation of the gate pulse generator of the information storage apparatus in accordance with the present invention. More specifically, FIG. 25A shows a track format, FIG. 25B shows the land sector mark search start pulse, FIG. 25C shows the land sector mark detection pulse, FIG. 25D shows the groove sector mark detection pulse, FIG. 25E shows the land/groove identifying pulse, FIG. 25F shows the land ID gate, FIG. 25G shows the land ID read gate, FIG. 25H shows the ID read gate, FIG. 25I shows the first synchronizing signal window open pulse, FIG. 25J shows the second synchronizing signal window open pulse, FIG. 25K shows the first synchronizing signal window close pulse, FIG. 25L shows the second synchronizing signal window close pulse, and FIG. 25M shows the synchronizing signal window. It should be noted that the reference numerals used in these figures indicate the same components as the reference numerals used in FIG. 11.

When a read/write command is issued, the land sector mark search start pulse is outputted as an event, as shown in FIG. 25B. As the land sector mark search start pulse is outputted, the land ID gate is opened as shown in FIG. 25F. After the land ID gate is opened, the land sector mark 124 is supplied, and is then detected as shown in FIG. 25C. While the land ID gate is open, the land ID read gate shown in FIG. 25G is opened. The land ID read gate is opened in the positions of the conventional headers.

Next, the land/groove identifying pulse shown in FIG. 25E is generated as an event, and the land ID gate shown in FIG. 25F is closed.

When the second synchronizing signal window open pulse shown in FIG. 25J is generated as an event, the synchronizing signal window shown in FIG. 25M is opened. When the second synchronizing signal window close pulse shown in FIG. 25L is generated as an event, the synchronizing signal window shown in FIG. 25M is closed.

When the light beam L reaches the sector mark 126, the land ID read gate is opened as shown in FIG. 25G. However, the land ID gate remains closed as shown in FIG. 25F, and accordingly, the ID read gate also remains closed as shown in FIG. 25H. Thus, groove ID readout can be prevented at the time of land track scanning.

In the above manner, in a sector without an ID, the servo window is expanded from 5 bytes to 8 bytes, for instance, so as to provide a margin to hold servo information within the servo window. Thus, servo timing gaps due to irregular disk rotation or disk eccentricity can be absorbed.

Figure 26:
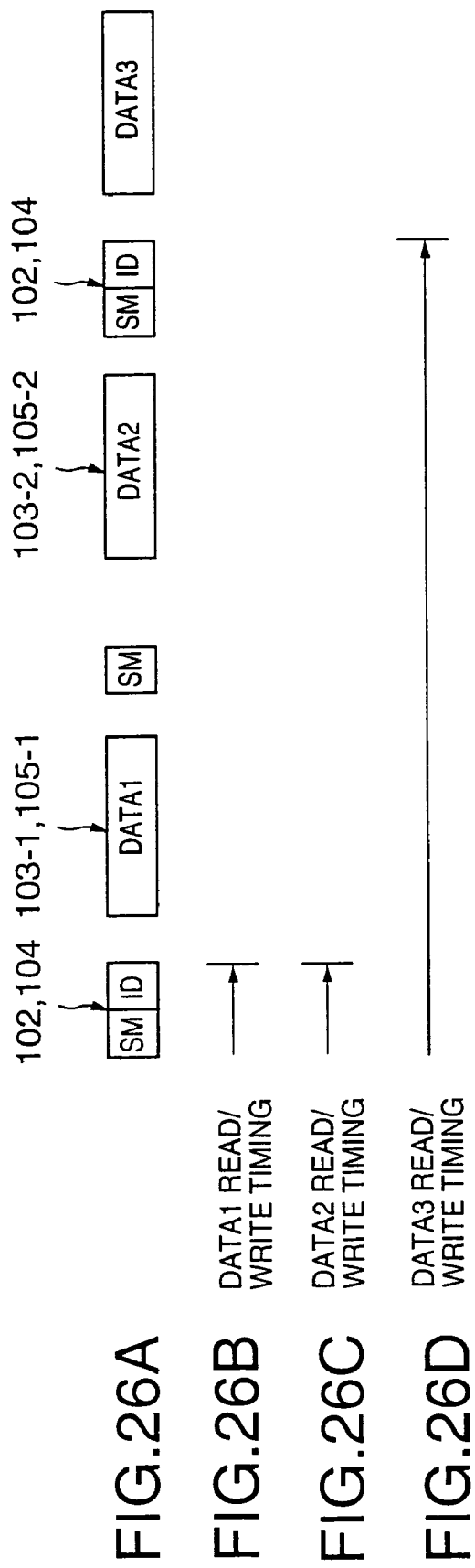
FIGS. 26A to 26D illustrate a read/write start timing operation in a data area of the information storage apparatus in accordance with the present invention.

FIGS. 26A to 26D illustrate the read/write timing operation in a data area of the information storage apparatus in accordance with the present invention. More specifically, FIG. 26A shows a format of a track to be read or written, FIGS. 26B and 26D each show the read/write timing for the first data area 103-1 or 105-1, and FIG. 26C shows the read/write timing for the second data area 103-2 or 105-2. The reference numerals in these figures indicate the same components as those in FIG. 6.

In a case where a data read/write operation is performed on the first data area 103-1 or 105-1 and the second data area 103-2 or 105-2, the data read/write operation is accepted when the header 102 or 104 is detected, as shown in FIGS. 26B and 26C. The data read/write operation on the data area having the next ID is performed when the next header 102 or 104 is detected. In this manner, the servo error detection sensitivity can be increased by 20%, compared with the conventional servo error detection sensitivity.

Figure 27:
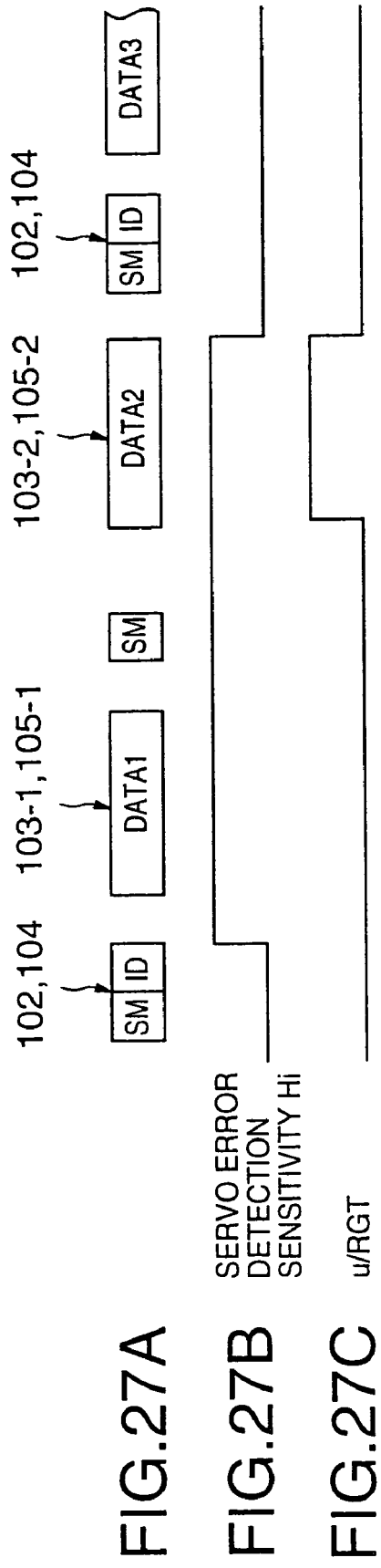
FIGS. 27A to 27C illustrate the state of a servo error detection sensitivity of the information storage apparatus in accordance with the present invention.

FIGS. 27A to 27C illustrate the states of the servo error detection sensitivity of the information storage apparatus in accordance with the present invention. More specifically, FIG. 27A is a format of a track to be scanned with the light beam L, FIG. 27B shows the states of the servo error detection sensitivity set by the servo error detecting circuit 211, and 27C shows the states of the read/write gate.

When the light beam reaches the data area 103-1 or 105-1 shown in FIG. 27A, the servo error detection sensitivity is increased as shown in FIG. 27B.

If the light beam drifts from the track of the first data area 103-1 to 105-1 to an adjacent track before a read/write operation is performed on the second data area 103-2 or 105-2, the read/write operation might be performed on a data area on the adjacent track. Therefore, the servo error detection sensitivity is increased to detect the servo error, so that the read/write operation in the wrong position can be immediately stopped.

Although one header is set for two data areas in the above embodiment, it is possible to set one header for more than two data areas. Also, the headers may be arranged in different manners from the above embodiment.

Figure 28:
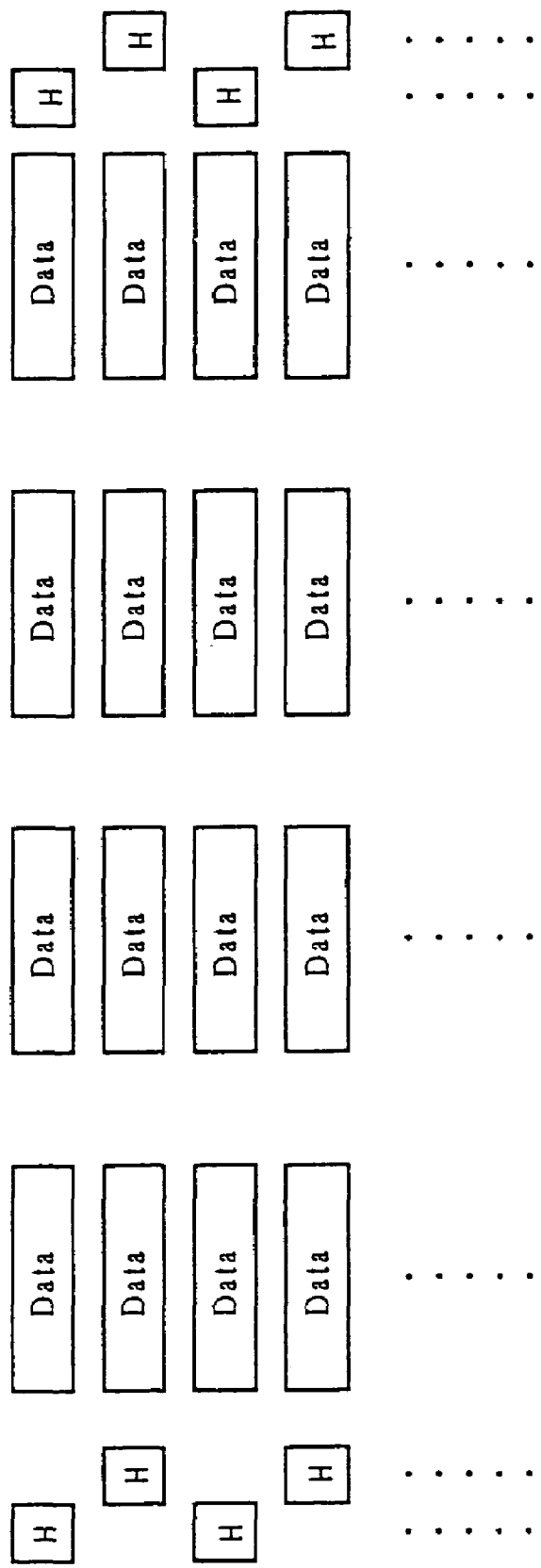
FIG. 28 shows a format in a fifth embodiment of the recording medium in accordance with the present invention.

FIG. 28 shows a format in a fifth embodiment of the recording medium in accordance with the present invention. As shown in FIG. 28, one header is set for four data areas, and each header is shifted from the headers on the adjacent tracks.

Figure 29:
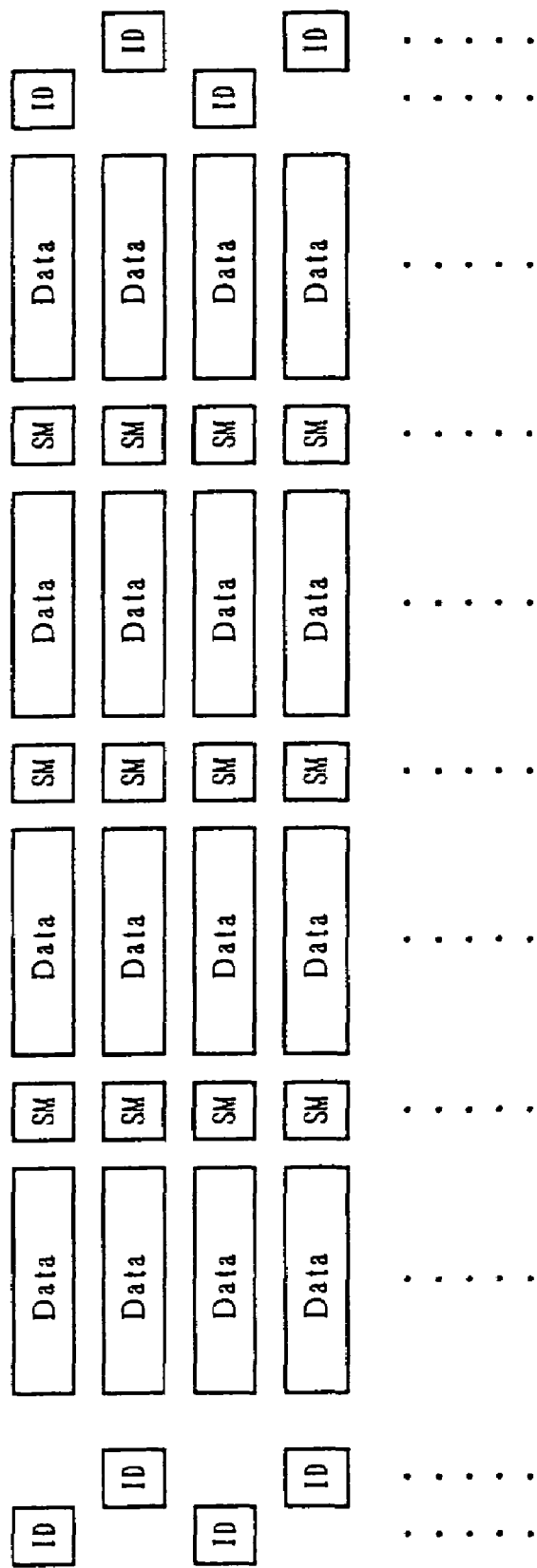
FIG. 29 shows a format in a sixth embodiment of the recording medium in accordance with the present invention.

FIG. 29 shows a format in a sixth embodiment of the recording medium in accordance with the present invention. In this embodiment, a sector mark is placed before each data area without an ID, and the other arrangements are the same as in FIG. 28.

With the recording medium or the information storage apparatus of this embodiment, the formatting efficiency is increased from 87% to 93%. Since a sector mark is provided for each data area without an ID, a read/write gate deviation due to disk eccentricity or rotation jitter can be corrected.

As described so far, since the ID read gate for reading an ID is not outputted in a data area without an ID, an ID on an adjacent track cannot be read when crosstalk occurs in the data area without an ID. Thus, wrong ID detection can be prevented.

Moreover, in a land/groove medium having close-pitched tracks as shown in FIG. 13, the sector marks on the groove tracks can be detected by crosstalk when the light beam is scanning a land track. Thus, sector mark detection can be accurately performed without forming a sector mark on the land tracks.

Also, in a land/groove medium, the sector marks on the land tracks and the sector marks on the groove tracks may be differentiated as the "EVEN BAND" and the "ODD BAND" specified in ISO/IEC 15041. By doing so, at a time of land track scanning, the ID read gate is opened only when a sector mark on the land track is detected. Thus, groove ID reading can be prevented at the time of land track scanning. In the case where the "EVEN BAND" and "ODD BAND" specified in ISO/IEC 15041 are employed, the sector mark detector is unnecessary. For instance, sector mark detection can be performed by a sector mark detector in a 640-Mbyte medium that is already on the market, and compatibility with the existing 640-Mvyte media can be maintained.

The present invention is not limited to the specifically disclosed embodiments, but variations and modifications may be made without departing from the scope of the present invention.

The present application is based on Japanese priority application No. 11-192311, filed on Jul. 6, 1999, the entire contents of which are hereby incorporated by reference.

What is claimed is:

1. An information storage apparatus for making access to a recording medium which has data sectors, and identifier portions each provided for more than one of the data sectors, each of the identifier portions being arranged in positions shifted from each other on adjacent tracks, said information storage apparatus comprising:

an address determination unit which generates addresses of the data sectors based on the identifier portions, and determines whether a desired data sector is reached in accordance with the addresses.

2. The information storage apparatus as claimed in claim 1, wherein the address determination unit counts the number of data sectors, and generates the addresses based on the identifier portions and the number of the data sectors.

3. The information storage apparatus as claimed in claim 1, further comprising a servo controller which changes servo error sensitivity based on an identifier portion closest to a desired data sector having no identifier portion when read/write is performed on the desired data sector.

4. The information storage apparatus as claimed in claim 1, wherein the address determination unit outputs a window signal having an expanded margin with respect to timing at which the address determination unit determines the address of a data sector with no identifier portion.

5. The information storage apparatus as claimed in claim 1, wherein when the address determination unit determines the address of a data sector with no identifier portion, data is received from a data sector which has the identifier portion and is located immediately before the sector with no identifier portion.

* * * * *